United States Patent
Shimazu

(10) Patent No.: US 11,775,876 B2
(45) Date of Patent: Oct. 3, 2023

(54) METHODS AND SYSTEMS FOR RELATING FEATURES WITH LABELS IN ELECTRONICS

(71) Applicant: Optimal Plus Ltd, Holon (IL)

(72) Inventor: Katsuhiro Shimazu, Sapporo (JP)

(73) Assignee: Optimal Plus Ltd., Holon (IL)

( * ) Notice: Subject to any disclaimer, the term of this patent is extended or adjusted under 35 U.S.C. 154(b) by 347 days.

(21) Appl. No.: 16/545,708

(22) Filed: Aug. 20, 2019

(65) Prior Publication Data

US 2021/0056444 A1  Feb. 25, 2021

(51) Int. Cl.
| | |
|---|---|
| *G06N 20/20* | (2019.01) |
| *G06N 5/04* | (2023.01) |
| *G06N 20/00* | (2019.01) |
| *G06F 18/214* | (2023.01) |
| *G06N 5/01* | (2023.01) |
| *G06F 17/18* | (2006.01) |

(52) U.S. Cl.
CPC ............ *G06N 20/20* (2019.01); *G06F 18/214* (2023.01); *G06N 5/01* (2023.01); *G06N 5/04* (2013.01); *G06N 20/00* (2019.01); *G06F 17/18* (2013.01)

(58) Field of Classification Search
CPC .......... G06N 5/04; G06N 20/00; G06N 20/10; G06N 20/20; G06N 5/003; G06N 5/01; G06F 17/18
See application file for complete search history.

(56) References Cited

U.S. PATENT DOCUMENTS

| | | | |
|---|---|---|---|
| 2014/0337096 A1* | 11/2014 | Bilenko | G06Q 30/0202 705/7.31 |
| 2019/0064253 A1* | 2/2019 | David | G01R 31/287 |
| 2019/0065989 A1* | 2/2019 | Kida | G06F 17/18 |
| 2019/0277913 A1* | 9/2019 | Honda | G01R 31/2894 |
| 2019/0304849 A1* | 10/2019 | Cheong | G06N 20/20 |

OTHER PUBLICATIONS

Won et al., Random Forest Model for Silicon-to-SPICE Gap and FinFET Design Attribute Identification, IEIE Transactions on Smart Processing and Computing, vol. 5, No. 5, Oct. 2016, pp. 358-365 (Year: 2016).*

(Continued)

*Primary Examiner* — Li B. Zhen
*Assistant Examiner* — William Wai Yin Kwan
(74) *Attorney, Agent, or Firm* — Kowert, Hood, Munyon, Rankin & Goetzel, P.C.; Jeffrey C. Hood; Luke Langsjoen

(57) ABSTRACT

A method comprising, by a processing unit and a memory: obtaining a training set of data; dividing sets of data into a plurality of groups, wherein all sets of data for which feature values meet at least one similarity criterion, are in the same group, storing in a reduced training set of data, for each group, at least one aggregated set of data, wherein, for a plurality of the groups, a number of aggregated sets of data is less than a number of the sets of data of the group, wherein the reduced training set of data is suitable to be used in a classification algorithm for determining a relationship between the at least one label and the features of the electronic items, thereby reducing computation complexity when processing the reduced training set of data, compared to processing the training set of data.

20 Claims, 19 Drawing Sheets

(56) References Cited

OTHER PUBLICATIONS

Graefe, Goetz, Query Evaluation Techniques for Large Databases, ACM Computing Surveys, vol. 25, No. 2, Jun. 1993 (Year: 1993).*
Chen, Hongge, Novel Machine Learning Approaches for Modeling Variations in Semiconductor Manufacturing (Masters Thesis), Massachusetts Institute of Technology Jun. 2017, 96 pages (Year: 2017).*
Liu et al., Isolation Forest, 2008 Eighth IEEE International Conference on Data Mining, IEEE 2008 (Year: 2008).*
Brownlee, Jason, Bagging and Random Forest Ensemble Algorithms for Machine Learning, retrieved from web.archive.org dated Jun. 25, 2019 (http://web.archive.org/web/20190625001106/https://machinelearningmastery.com/bagging-and-random-forest-ensemble-algorithms-for-machine-learning/), 9 pages (Year: 2019).*
Kaempf, Ulrich, The Binomial Test: A Simple Tool to Identify Process Problems, IEEE Transactions on Semiconductor Manufacturing, vol. 8, No. 2, May 1995, pp. 160-166 (Year: 1995).*
H.Won and K.Shimazu, "Random Forest Model for Silicon-to-SPICE Gap and FinFET Design Attribute Identification", IEIE Transactions on SPC, vol. 5, No. 5, pp. 358-365, Oct. 2016.

* cited by examiner

| FT 1 | FT 2 | FT 3 | FT 4 | FT 5 | FT 6 | FT 7 | ... | FT N | LA 1 |
|---|---|---|---|---|---|---|---|---|---|
| ... | ... | ... | ... | ... | ... | ... | ... | ... | ... |
| ... | ... | ... | ... | ... | ... | ... | ... | ... | ... |
| ... | ... | ... | ... | ... | ... | ... | ... | ... | ... |
| ... | ... | ... | ... | ... | ... | ... | ... | ... | ... |
| ... | ... | ... | ... | ... | ... | ... | ... | ... | ... |
| ... | ... | ... | ... | ... | ... | ... | ... | ... | ... |
| ... | ... | ... | ... | ... | ... | ... | ... | ... | ... |
| ... | ... | ... | ... | ... | ... | ... | ... | ... | ... |

| FT 1 | FT 2 | FT 3 | FT 4 | FT 5 | FT 6 | FT 7 | FT 8 | FT 9 | LA 1 | |
|---|---|---|---|---|---|---|---|---|---|---|
| LVT | p | 2 | 22 | 68 | 110 | No | 1_1 | edge | 0 | G1 |
| LVT | p | 2 | 22 | 68 | 110 | No | 1_1 | edge | 1 | G1 |
| LVT | p | 2 | 22 | 68 | 110 | No | 1_1 | edge | 0 | G1 |
| ... | ... | ... | ... | ... | ... | ... | ... | ... | ... | |
| RVT | p | 3 | 22 | 68 | 50 | Yes | 0.7_1 | edge | 0 | G2 |
| RVT | p | 3 | 22 | 68 | 50 | Yes | 0.7_1 | edge | 0 | G2 |
| RVT | p | 3 | 22 | 68 | 50 | Yes | 0.7_1 | edge | 1 | G2 |
| ... | ... | ... | ... | ... | ... | ... | ... | ... | ... | |

| | FT 1 | FT 2 | FT 3 | FT 4 | FT 5 | FT 6 | FT 7 | FT 8 | FT 9 | LA 1 (fail count) | Data count |
|---|---|---|---|---|---|---|---|---|---|---|---|
| | LVT | p | 2 | 22 | 68 | 110 | No | 1_1 | edge | 69 | 79,691 |
| | RVT | p | 3 | 22 | 68 | 50 | Yes | 0.7_1 | edge | 8 | 110,359 |
| | LVT | p | 2 | 22 | 68 | 250 | Yes | 1_1 | edge | 49 | 82,772 |
| | RVT | p | 2 | 22 | 68 | 110 | No | 1_1 | edge | 25 | 104,375 |
| | LVT | p | 2 | 20 | 68 | 120 | No | 1_1 | edge | 15 | 2,990 |
| | ... | ... | ... | ... | ... | ... | ... | ... | ... | ... | ... |
| | ... | ... | ... | ... | ... | ... | ... | ... | ... | ... | ... |
| | ... | ... | ... | ... | ... | ... | ... | ... | ... | ... | ... |

| | FT 1 | FT 2 | FT 3 | FT 4 | FT 5 | FT 6 | FT 7 | FT 8 | FT 9 |
|---|---|---|---|---|---|---|---|---|---|
| 430 | LVT | p | 2 | 22 | 68 | 110 | No | 1_1 | edge |
| | ... | ... | ... | ... | ... | ... | ... | ... | ... |
| 431 | LVT | p | 2 | 22 | 66 | 110 | No | 1_1 | edge |
| | ... | ... | ... | ... | ... | ... | ... | ... | ... |
| 432 | LVT | p | 2 | 22 | 69 | 110 | No | 1_1 | edge |
| | ... | ... | ... | ... | ... | ... | ... | ... | ... |
| | ... | ... | ... | ... | ... | ... | ... | ... | ... |
| | ... | ... | ... | ... | ... | ... | ... | ... | ... |

$G_1$ brackets rows 430–432.

⇩

| | FT 1 | FT 2 | FT 3 | FT 4 | FT 5 | FT 6 | FT 7 | FT 8 | FT 9 |
|---|---|---|---|---|---|---|---|---|---|
| 440 | LVT | p | 2 | 22 | 67.6 | 110 | No | 1_1 | edge |
| | ... | ... | ... | ... | ... | ... | ... | ... | ... |
| | ... | ... | ... | ... | ... | ... | ... | ... | ... |
| | ... | ... | ... | ... | ... | ... | ... | ... | ... |
| | ... | ... | ... | ... | ... | ... | ... | ... | ... |
| | ... | ... | ... | ... | ... | ... | ... | ... | ... |
| | ... | ... | ... | ... | ... | ... | ... | ... | ... |
| | ... | ... | ... | ... | ... | ... | ... | ... | ... |

| FT 1 | FT 2 | FT 3 | FT 4 | FT 5 | FT 6 | FT 7 | FT 8 | FT 9 | LA 1 (fail count) | Data count |
|---|---|---|---|---|---|---|---|---|---|---|
| LVT | p | 2 | 22 | 68 | 110 | No | 1_1 | edge | 69 | 79,691 |
| RVT | p | 3 | 22 | 68 | 50 | Yes | 0.7_1 | edge | 8 | 110,359 |
| LVT | p | 2 | 22 | 68 | 250 | Yes | 1_1 | edge | 49 | 82,772 |
| RVT | p | 2 | 22 | 68 | 110 | No | 1_1 | edge | 25 | 104,375 |
| LVT | p | 2 | 20 | 68 | 120 | No | 1_1 | edge | 15 | 2,990 |
| ... | ... | ... | ... | ... | ... | ... | ... | ... | ... | ... |
| ... | ... | ... | ... | ... | ... | ... | ... | ... | ... | ... |
| ... | ... | ... | ... | ... | ... | ... | ... | ... | ... | ... |

| FT 1 | FT 2 | FT 3 | FT 4 | FT 5 | FT 6 | FT 7 | FT 8 | FT 9 | LA 1 (fail count) | Data count |
|---|---|---|---|---|---|---|---|---|---|---|
| LVT | p | 2 | 22 | 68 | 110 | No | 1_1 | edge | 69 | 79,731 |
| RVT | p | 3 | 22 | 68 | 50 | Yes | 0.7_1 | edge | 8 | 101,160 |
| LVT | p | 2 | 22 | 68 | 250 | Yes | 1_1 | edge | 49 | 82,460 |
| RVT | p | 2 | 22 | 68 | 110 | No | 1_1 | edge | 25 | 104,363 |
| LVT | p | 2 | 20 | 68 | 120 | No | 1_1 | edge | 15 | 3,043 |
| ... | ... | ... | ... | ... | ... | ... | ... | ... | ... | ... |
| ... | ... | ... | ... | ... | ... | ... | ... | ... | ... | ... |
| ... | ... | ... | ... | ... | ... | ... | ... | ... | ... | ... |

| FT 1 | FT 2 | FT 3 | FT 4 | FT 5 | FT 6 | FT 7 | FT 8 | FT 9 | LA 1 (fail count) | Data count |
|---|---|---|---|---|---|---|---|---|---|---|
| LVT | p | 2 | 22 | 68 | 110 | No | 1_1 | edge | 69 | 79,691 |
| RVT | p | 3 | 22 | 68 | 50 | Yes | 0.7_1 | edge | 8 | 110,359 |
| LVT | p | 2 | 22 | 68 | 250 | Yes | 1_1 | edge | 49 | 82,772 |
| RVT | p | 2 | 22 | 68 | 110 | No | 1_1 | edge | 25 | 104,375 |
| LVT | p | 2 | 20 | 68 | 120 | No | 1_1 | edge | 15 | 2,990 |
| ... | ... | ... | ... | ... | ... | ... | ... | ... | ... | ... |
| ... | ... | ... | ... | ... | ... | ... | ... | ... | ... | ... |
| ... | ... | ... | ... | ... | ... | ... | ... | ... | ... | ... |

| FT 1 | FT 2 | FT 3 | FT 4 | FT 5 | FT 6 | FT 7 | FT 8 | FT 9 | LA 1 (fail count) | Data count |
|---|---|---|---|---|---|---|---|---|---|---|
| LVT | p | 2 | 22 | 68 | 110 | No | 1_1 | edge | 73 | 79,691 |
| RVT | p | 3 | 22 | 68 | 50 | Yes | 0.7_1 | edge | 9 | 110,359 |
| LVT | p | 2 | 22 | 68 | 250 | Yes | 1_1 | edge | 56 | 82,772 |
| RVT | p | 2 | 22 | 68 | 110 | No | 1_1 | edge | 26 | 104,375 |
| LVT | p | 2 | 20 | 68 | 120 | No | 1_1 | edge | 18 | 2,990 |
| ... | ... | ... | ... | ... | ... | ... | ... | ... | ... | ... |
| ... | ... | ... | ... | ... | ... | ... | ... | ... | ... | ... |
| ... | ... | ... | ... | ... | ... | ... | ... | ... | ... | ... |

| FT 1 | FT 2 | FT 3 | FT 4 | FT 5 | FT 6 | FT 7 | FT 8 | FT 9 | LA 1 (fail count) | Data count |
|---|---|---|---|---|---|---|---|---|---|---|
| LVT | p | 2 | 22 | 68 | 110 | No | 1_1 | edge | 69 | 79,691 |
| RVT | p | 3 | 22 | 68 | 50 | Yes | 0.7_1 | edge | 8 | 110,359 |
| LVT | p | 2 | 22 | 68 | 250 | Yes | 1_1 | edge | 49 | 82,772 |
| RVT | p | 2 | 22 | 68 | 110 | No | 1_1 | edge | 25 | 104,375 |
| LVT | p | 2 | 20 | 68 | 120 | No | 1_1 | edge | 15 | 2,990 |
| ... | ... | ... | ... | ... | ... | ... | ... | ... | ... | ... |
| ... | ... | ... | ... | ... | ... | ... | ... | ... | ... | ... |
| ... | ... | ... | ... | ... | ... | ... | ... | ... | ... | ... |

| FT 1 | FT 2 | FT 3 | FT 4 | FT 5 | FT 6 | FT 7 | FT 8 | FT 9 | LA 1 (fail count) | Data count |
|---|---|---|---|---|---|---|---|---|---|---|
| LVT | p | 2 | 22 | 68 | 110 | No | 1_1 | edge | 73 | 79,731 |
| RVT | p | 3 | 22 | 68 | 50 | Yes | 0.7_1 | edge | 9 | 101,160 |
| LVT | p | 2 | 22 | 68 | 250 | Yes | 1_1 | edge | 56 | 82,460 |
| RVT | p | 2 | 22 | 68 | 110 | No | 1_1 | edge | 26 | 104,363 |
| LVT | p | 2 | 20 | 68 | 120 | No | 1_1 | edge | 18 | 3,043 |
| ... | ... | ... | ... | ... | ... | ... | ... | ... | ... | ... |
| ... | ... | ... | ... | ... | ... | ... | ... | ... | ... | ... |
| ... | ... | ... | ... | ... | ... | ... | ... | ... | ... | ... |

METHODS AND SYSTEMS FOR RELATING FEATURES WITH LABELS IN ELECTRONICS

TECHNICAL FIELD

The presently disclosed subject matter relates to methods and systems for relating features with labels in the field of electronics, and in particular, for determining a relationship between manufacturing data and quality attributes of electronic items.

BACKGROUND

Electronic devices or processes are associated with a large number of features (e.g. manufacturing data).

These features can have an impact on one or more representative labels (e.g. quality/performance attributes) and therefore are generally monitored.

Current methods for analysing a relationship between features and labels are difficult to implement, in particular due do their computational load, relative lack of efficiency, and slowness.

There is a need to propose new methods and systems for determining a relationship between features and labels in the field of electronics.

GENERAL DESCRIPTION

In accordance with certain aspects of the presently disclosed subject matter, there is a method comprising, by a processing unit and a memory:
  obtaining a training set of data comprising a plurality of sets of data each representative of an electronic item, each set comprising data values for a plurality of features, and for at least one label,
  building a reduced training set of data which comprises an aggregated representation of the training set of data, the building comprising:
    dividing the sets of data into a plurality of groups, wherein all sets of data, for which feature values meet at least one similarity criterion, are in the same group,
    storing in the reduced training set of data, for each group, at least one aggregated set of data comprising: an aggregated representation of feature values for the one or more sets of data of the group, an aggregated representation of at least one label value of the one or more sets of data of the group, and data representative of a number of the one or more sets of data of the group,
  wherein for a plurality of the groups which comprise a plurality of sets of data, a number of aggregated set of data is less than a number of the sets of data of the group, wherein the reduced training set of data is suitable to be used in a classification algorithm implementing one or more decision trees for determining a relationship between the at least one label and the features of the electronic items, thereby reducing computation complexity when processing the reduced training set of data by the classification algorithm, compared to processing the training set of data.

In addition to the above features, the method according to this aspect of the presently disclosed subject matter can optionally comprise one or more of features (i) to (xiii) below, in any technically possible combination or permutation:

i. for a feature, feature values of different sets of data meet the similarity criterion if at least one of (a), (b), (c) and (d) is met: (a) the feature values are equal; (b) the feature values do not differ one from the other more than a threshold; (c) the feature values are equal after the feature values have been approximated; (d) at least one of (a), (b), (c) is met and label values of the different sets of data are similar according to a second similarity criterion;
ii. the features correspond to manufacturing data of the electronic item and the at least one label corresponds to at least one quality attribute of the electronic item;
iii. for a majority of the groups comprising a plurality of sets of data, a number of aggregated set of data is less than a number of the sets of data of the group by a magnitude of at least ten;
iv. the aggregated representation of at least one label value of the one or more sets of data of the group comprises a sum of all label values of the one or more sets of data of the group;
v. the method comprises randomizing the reduced training set of data in order to obtain a plurality of randomized reduced training sets of data, wherein each of the randomized reduced training set of data is suitable to be used in a different decision tree of the classification algorithm, for determining a relationship between the at least one label and the features, based on an output of the different decision trees;
vi. the randomizing comprises randomizing, for each aggregated set of data of the reduced training set of data, at least one of the aggregated representation of at least one label value associated with the aggregated set of data, and data representative of a number of the one or more sets of data of the group;
vii. randomizing the aggregated representation of at least one label value associated with the aggregated set of data is based on a probability distribution characterizing probability to obtain different values for the aggregated representation of the at least one label value; randomizing data representative of a number of the one or more sets of data of the group is based on a probability distribution characterizing probability to obtain different values of this data representative of a number of the one or more sets of data of the group;
viii. the method comprises randomizing the training set of data in order to obtain a plurality of randomized training sets of data, for each randomized training set of data, building a reduced randomized training set of data which comprises an aggregated representation of the randomized training set of data, the building comprising dividing the sets of data of the randomized training set of data into a plurality of groups, wherein all sets of data for which feature values meet at least one similarity criterion, are in the same group, storing in the reduced randomized training set of data, for each group, at least one aggregated set of data comprising: an aggregated representation of feature values for the one or more sets of data of the group, an aggregated representation of at least one label value of the one or more sets of data of the group, and data representative of a number of the one or more sets of data of the group, wherein for a plurality of the groups which comprise a plurality of sets of data, a number of aggregated set of data is less than a number of the sets of data of the group, wherein each of the reduced randomized training sets of data is suitable to be used in a classification algorithm implementing one or more decision trees for determining a relationship between the at least one label and the features for the electronic items, thereby reducing computation complexity when processing the randomized reduced training set of data by the classification algorithm compared to processing the randomized training set of data;

ix. the reduced training set of data comprises a plurality of aggregated sets of data, wherein the number of aggregated sets of data in the reduced training set of data does not increase if the training set of data is expanded with at least one set of data comprising features values which are similar to feature values already present in the training set of data for at least one set of data, according to the similarity criterion;

x. the method comprise feeding the reduced training set of data in a decision tree based classification algorithm, in order to determine a relationship between the at least one label and the features of the electronic items;

xi. the method comprises, by a processing unit, providing at least one set of data comprising a plurality of feature values representative of at least one electronic item, for which at least one label value is to be predicted, and predicting, based on the relationship, the label value associated with the set of data, thereby allowing prediction for the at least one electronic item;

xii. the method comprises, based on the relationship, determining at least one of: an importance of one or more features with respect to the at least one label, the importance being representative of a level of contribution of the features in the at least one label; and an impact of one or more features with respect to the at least one label, the impact being representative of whether the one or more features increase or decrease the at least one label;

xiii. the training set data is collected from at least operational data collected from at least a manufacturing line of one or more electronic items, the method comprising determining a relationship between the at least one label and one or more of the features for the one or more electronic items, and updating this relationship based on an update of the operational data during manufacturing.

In accordance with certain aspects of the presently disclosed subject matter, there is provided a method, comprising, by a processing unit and a memory, obtaining a training set of data comprising a plurality of sets of data each representative of an electronic item, each set of data comprising: data values for a plurality of features, data value for at least one label, data representative of a number of times other sets of data of another training set of data comprise data values for the features which are similar to data values of features of the set of data of the training set of data, the method comprising feeding the training set to a decision tree based classification algorithm, and determining a relationship between the at least one label and the features for the electronic items.

In accordance with certain aspects of the presently disclosed subject matter, there is provided a non-transitory storage device readable by a machine, tangibly embodying a program of instructions executable by the machine to perform the method described above.

In addition to the above features, the training set can be obtained e.g. using the method described previously (see features (i) to (xiii), in any technically possible combination or permutation).

In accordance with certain aspects of the presently disclosed subject matter, there is provided a system comprising a processing unit and a memory, configured to:
obtain a training set of data comprising a plurality of sets of data each representative of an electronic item, each set comprising data values for a plurality of features, and for at least one label,
build a reduced training set of data which comprises an aggregated representation of the training set of data,
the building comprising dividing the sets of data into a plurality of groups, wherein all sets of data for which feature values meet at least one similarity criterion are in the same group, storing in the reduced training set of data, for each group, at least one aggregated set of data comprising an aggregated representation of feature values for the one or more sets of data of the group, an aggregated representation of at least one label value of the one or more sets of data of the group, and data representative of a number of the one or more sets of data of the group, wherein for a plurality of the groups which comprise a plurality of sets of data, a number of aggregated set of data is less than a number of the sets of data of the group, wherein the reduced training set of data is suitable to be used in a classification algorithm implementing one or more decision trees for determining a relationship between the at least one label and the features of the electronic items, thereby reducing computation complexity when processing the reduced training set of data by the classification algorithm compared to processing the training set of data.

In addition to the above features, the system according to this aspect of the presently disclosed subject matter can optionally comprise one or more of features (xiv) to (xvi) below, in any technically possible combination or permutation xiv. the system is configured to randomize the reduced training set of data in order to obtain a plurality of randomized reduced training sets of data, wherein each of the randomized reduced training set of data is suitable to be used in a different decision tree of the classification algorithm, for determining a relationship between the at least one label and the features, based on an output of the different decision trees;

xv. the randomizing comprises randomizing, for each aggregated set of data of the reduced training set of data, at least one of the aggregated representation of at least one label value associated with the aggregated set of data, and data representative of a number of the one or more sets of data of the group; and xvi. the system is configured to provide at least one set of data comprising a plurality of feature values representative of at least one electronic item, for which at least one label value is to be predicted, and predict, based on the relationship, the label value associated with the set of data, thereby allowing prediction for the at least one electronic item.

In addition to the above features, the system according to this aspect of the presently disclosed subject matter can optionally implement one or more of features (i) to (xiii) above, in any technically possible combination or permutation.

In accordance with certain aspects of the presently disclosed subject matter, there is provided a non-transitory storage device readable by a machine, tangibly embodying a program of instructions executable by the machine to perform operations comprising: obtaining a training set of data comprising a plurality of sets of data each representative of an electronic item, each set comprising data values for a plurality of features, and for at least one label, building a reduced training set of data which comprises an aggregated representation of the training set of data, the building comprising: dividing the sets of data into a plurality of groups, wherein all sets of data, for which feature values meet at least one similarity criterion, are in the same group, storing in the reduced training set of data, for each group, at least one aggregated set of data comprising an aggregated representation of feature values for the one or more sets of data of the group, an aggregated representation of at least one label value of the one or more sets of data of the group, and data representative of a number of the one or more sets of data of the group, wherein for a plurality of the groups which comprise a plurality of sets of data, a number of aggregated set of data is less than a number of the sets of data of the group, wherein the reduced training set of data is suitable to be used in a classification algorithm implementing one or more decision trees for determining a relationship between the at least one label and the features of the electronic items, thereby reducing computation complexity when processing the reduced training set of data by the classification algorithm, compared to processing the training set of data.

In addition to the above features, the program of instructions executable by the machine can perform operations described in features (i) to (xiii) above.

According to some embodiments, the proposed solution allows building one or more models which reflect a relationship between features and label(s) in a more efficient way, thereby facilitating monitoring of electronic items.

According to some embodiments, the proposed solution allows building one or more models which reflect a relationship between features and label(s) in a more efficient way with a reduced computational load, thereby facilitating monitoring of electronic items.

According to some embodiments, the proposed solution allows building one or more models which reflect a relationship between features and label(s) with less computational requirements while maintaining accuracy of the models.

According to some embodiments, the proposed solution allows building one or more models which reflect a relationship between features and label(s) in a quicker way, thereby providing more up-to-date and timely feedback which can be critical in several applications (in particular when monitoring a manufacturing line).

According to some embodiments, the proposed solution allows building one or more models which reflect a relationship between features and label(s) in a quicker way, even if a large data set is to be analysed.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods have not been described in detail so as not to obscure the presently disclosed subject matter.

Unless specifically stated otherwise, as apparent from the following discussions, it is appreciated that throughout the specification discussions utilizing terms such as "obtaining", "building", "storing", "associating", "determining", "randomizing", "splitting" or the like, refer to the action(s) and/or process(es) of a processing unit that manipulates and/or transforms data into other data, said data represented as physical, such as electronic, quantities and/or said data representing the physical objects.

The term "processing unit" covers any computing unit or electronic unit with data processing circuitry that may perform tasks based on instructions stored in a memory, such as a computer, a server, a chip, a processor, a hardware processor, etc. It encompasses a single processor or multiple processors, which may be located in the same geographical zone or may, at least partially, be located in different zones and may be able to communicate together.

The term "memory" as used herein should be expansively construed to cover any volatile or non-volatile computer memory suitable to the presently disclosed subject matter.

Embodiments of the presently disclosed subject matter are not described with reference to any particular programming language. It will be appreciated that a variety of programming languages may be used to implement the teachings of the presently disclosed subject matter as described herein.

The invention contemplates a computer program being readable by a computer for executing one or more methods of the invention. The invention further contemplates a machine-readable memory tangibly embodying a program of instructions executable by the machine for executing one or more methods of the invention.

Figure 1:
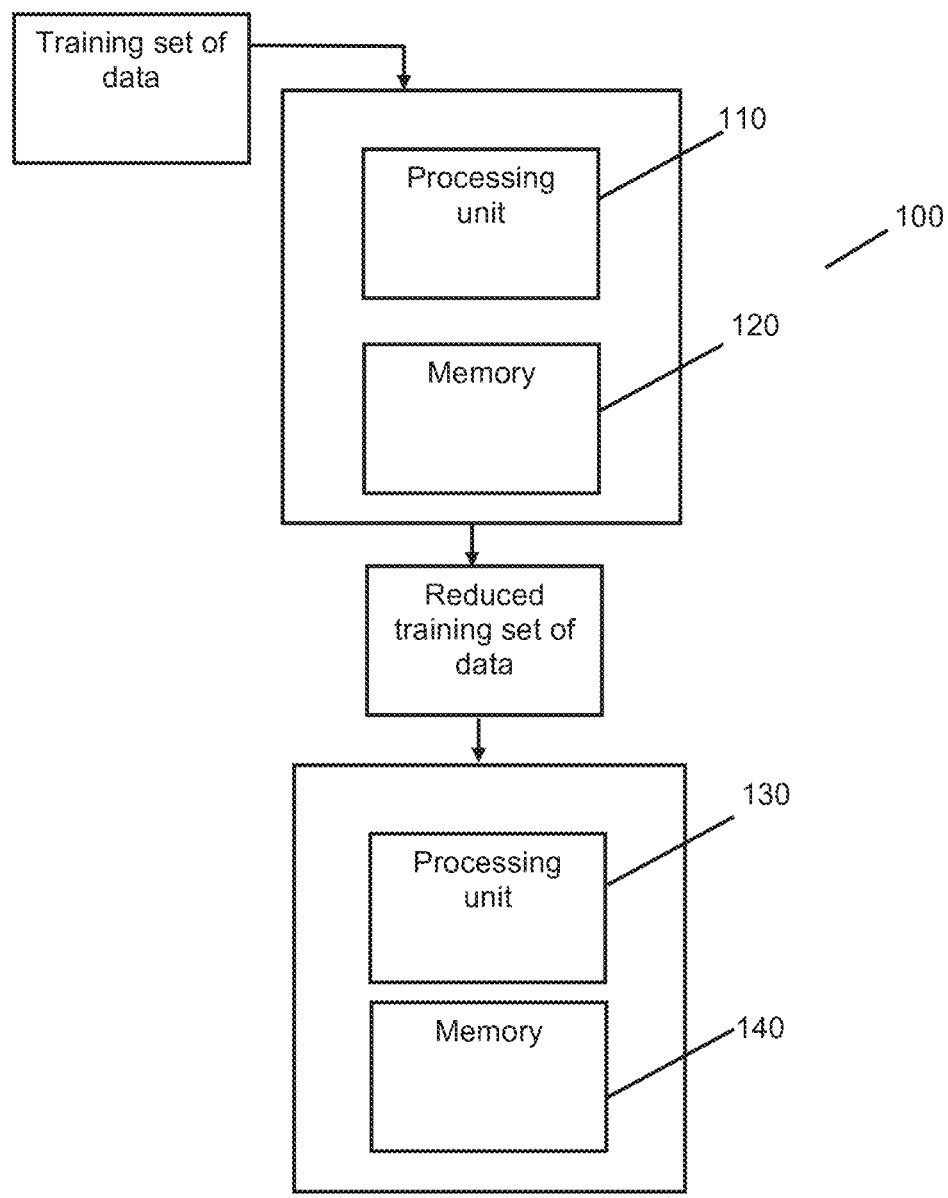
FIG. 1 illustrates an architecture of a system that can be used to implement one or more of the methods described hereinafter.

FIG. 1 illustrates an architecture of a system 100 that can be used to implement one or more of the methods described hereinafter.

System 100 can comprise a processing unit 110 and a memory 120. As explained hereinafter, according to some embodiments, the processing unit 110 can receive a training set of data (representative e.g. of one or more electronic items) and output a reduced training set of data.

System 100 can comprise a processing unit 130 and a memory 140. In some embodiments, the processing unit 130 and the processing unit 110 are the same processing unit but this is not mandatory. The same can apply to memory 120 and memory 140.

As explained hereinafter, according to some embodiments, the processing unit 130 can receive the reduced training set of data and output one or more models.

Once the model has been obtained, it can be used to perform various analyses, such as prediction of labels of electronic items based on features, optimization of features of electronic items in order to improve one or more labels (e.g. performance attributes), determination of importance or of impact of features of the electronic items, improvement of a manufacturing line, etc. Non-limitative examples will be provided hereinafter.

These various analyses can be performed e.g. by system 100 or by another processing unit which is associated with a memory storing the classification model(s).

Figures 2, 2A, 3:
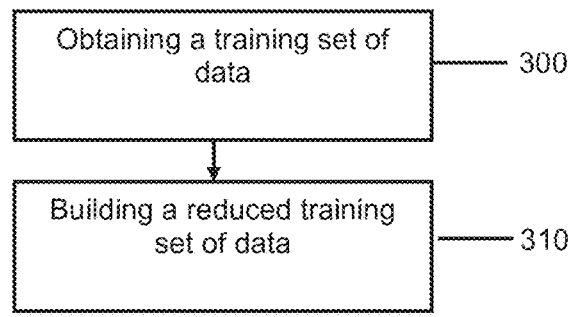
FIGS. 2 and 2A depict a training set of data that can be obtained for analysis.
FIG. 3 depicts an embodiment of a method of building a reduced training set of data.

Attention is now drawn to FIG. 2.

FIGS. 2 and 2A depict a training set of data 200 that can be obtained for analysis.

This data can be representative of one or more electronic items. Electronic items include e.g. electronic chips (e.g. dies, wafers, lots, components, etc.), electronic devices (circuits, computers, etc.), and the manufacturing process of electronic chips or devices, etc.

This training set can be collected or built e.g. based on measurements performed on site, and/or using simulation tools.

The training set of data comprises a plurality of sets of data. In the non-limitative representation of FIG. 2, each set of data is represented by a row, and the table comprises N rows.

Each set of data comprises features (see "FT 1" to "FT N") and at least one label (see "LA 1"—in some embodiments, a plurality of labels can be associated with each set of data).

Therefore, each set comprises a plurality of values for the features and for the at least one label.

These values can include numerical values (discrete or continuous), names of categories, etc. Examples are provided hereinafter.

As explained hereinafter, there can be many sets of data (i.e. rows) having the same (or similar) values for the features. For the same set of feature values, the label (or labels) can have different values. This can be due to the fact that the values of the labels can occur with a certain probability.

According to some embodiments, the features can correspond to manufacturing data, which can include test data, operational data, processing data generated by fabrication equipment involved in the physical construction ("fabrication") of an electronic item, test data generated by testing equipment involved in testing of an electronic item, data generated during rework in fabrication, historical or transactional data generated based on operational information contained in MES (Manufacturing Execution System) databases and related to history of the manufacturing that is being performed, data generated by an FIS (Factory Information Systems), logistical data (collected by (or from) MES through the manufacturing flow(s)), physical measurements (taken during component fabrication phase, during assembly packaging, during PC board manufacturing, etc.), fabrication data generated by fabrication equipment, manufacturing equipment maintenance data, monitor data, etc.

According to some embodiments, the label can correspond e.g. to a quality measurement, a performance measurement, a desired output for a given attribute (e.g. results of a test of an electronic item, etc.).

FIG. 2A provides a non-limitative example of a training set of data.

In this non-limitative example, the features are design features of a transistor. In particular:
  FT1 i.e. Feature 1 is threshold voltage type. It can have values such as "LVT", "RVT" or "SLVT";
  FT2 i.e. Feature 2 is channel type. It can have values such as "n" or "p";
  FT3 i.e. Feature 3 is fin count;
  FT4 i.e. Feature 4 is gate length;

FT5 i.e. Feature 5 is gate space;

FT6 i.e. Feature 6 is distance from gate to active area edge (gate to source side edge or gate to drain side edge, smaller value is selected);

FT7 i.e. Feature 7 is symmetry or not (symmetry structure of source side and drain side in terms of distance from gate to active area). It can have values including "yes" or "no";

FT8 i.e. Feature 8 is fin count ratio (ratio of tin count to the fin count of the neighbouring two gates); and FT9 i.e. Feature 9 is location (location on the fabricated silicon wafer).

It can have values such as "center", "edge" or "middle".

These features are not limitative.

In this non-limitative example, label "LA1" represents whether the transistor meets a test criterion. This label can have two values:

0 means "pass" i.e. the threshold voltage of the transistor is within the specification range;

1 means "fail" i.e. the threshold voltage of the transistor is out of the specification range.

As already mentioned above, different fail code (i.e. 0 or 1) can exist tier the same set of feature values. This is notably due to the fact that the fail or pass occur by a certain probability.

The data size of the training set of data (i.e. number of sets of data, including redundant sets of data) is, in this example, N=7,814,535 (corresponding to 7,814,535 rows in the table of FIG. 2A).

Attention is now drawn to FIG. 3.

It is attempted to build at least one model ("classification model") which reflects a relationship between features and label(s). Various use of this classification model will be described hereinafter, in particular in the electronics industry.

In order to facilitate building of the classification model, a method can comprise generating (operation 310) a reduced training set of data based on the training set of data (obtained at operation 300). The reduced training set of data can comprise an aggregated representation of the training set of data, as explained below.

Figures 3A, 4:
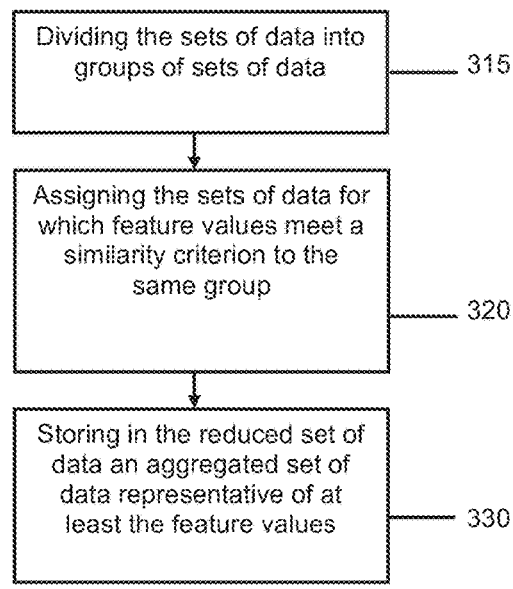
FIG. 3A describes a possible implementation of the method of FIG. 3.
FIG. 4 represents a reduced training set of data which can be obtained based on the training set of data of FIG. 2A.

FIG. 3A describes a possible implementation of the method of FIG. 3.

The method can comprise (operation 315) dividing the sets of data into a plurality of groups. Each set of data is assigned to a group.

The method can comprise assigning (operation 320) sets of data for which feature values are similar to the same group.

"Similar" feature values can include the same feature values and/or feature values which are similar according to at least one similarity criterion. The similarity criterion can be defined e.g. by an operator and can be stored in a memory (e.g. memory 120).

If a feature is a numerical value (for example, see "FT 5" in FIG. 2A, which corresponds to gate space), then the similarity criterion can be a relative difference that needs to be below a threshold (e.g. 2-5%, this value being not limitative).

In some embodiments, in particular when the feature comprises continuous numerical values, identification of similar feature values can comprise binning the values into a limited number of groups (bins). For example, a division of the feature values into 10 bins can comprise Bin1 (=less than or equal to 10 percentile), Bin2 (=greater than 10 percentile, but less than or equal to 20 percentile), Bin3 (=greater than 20 percentile, but less than or equal to 30 percentile), . . . , and Bin 10 (=greater than 90 percentile, but less than or equal to 100 percentile). Here, for example, "10 percentile" means the value of the data at the location of 10% data count of all the data when the data is sorted or arranged in increasing order of the value.

For example, if there are 200 of various numerical data (n), and they are arranged in the increasing order such as n(1), n(2), n(3), . . . , n(20), n(21), . . . , n(40), n(41), n(60), . . . , n(181), n(200). In this example, the expression "(x)" means data count from the most left data, maintaining the increasing order such as $n(1)<n(2)<n(3)<<n(20)<n(21)<\ldots, <n(40)<n(41)<\ldots, <n(60)<\ldots <n(181)<n(200)$. Data n(20) is the 20th data from the left (i.e. 20th smallest value), and it is at location of 10% data count in the total data count (=200). So in this case, data n(1)~n(20) are classified into Bin1. In the same way, data n(21)~n(40) are classified into Bin2, data n(41)~n(60) are classified into Bin3, . . . , and data n(181) n(200) are classified into Bin10.

According to some embodiments, identification of similar feature values can comprise rounding the feature values according to some rounding criterion. For example, the values 1.2345, 1.5678, 1.17898, 1.6234, . . . can be rounded at $1^{st}$ decimal digit to be 1.2000, 1.6000, 1.2000, 1.6000, so that similar or equal feature values can be identified.

If a feature is a non-numerical value (for example, see "FT 1" in FIG. 2A, which corresponds to threshold voltage type although in practice this kind of feature can be represented and stored as a number as categorical expression instead of character expression), then the similarity criterion will generally correspond to an equality between the two features (for example, M the table of FIG. 2A, two sets of data need to have the same name "LVT" or "RVT" stored for FT1 in order to be considered as similar). This is however not limitative, and, in some cases, it is also possible to define a similarity criterion for a feature which does not correspond to a numerical value. For example, assume the feature corresponds to a category of transistor, which can have values $C_1$ to $C_{10}$. It can be defined that category $C_i$ and $C_{i+1}$ will be considered as similar (for i from 1 to 9) because it is known (e.g. by an operator) that these categories share similarity.

In the example of FIG. 2A:

group G1 has been identified, which corresponds to sets of data which all comprise the following feature values: FT1=LVT; FT 2=p; FT 3=2; FT 4=22; FT 5=68; FT 6=110; FT 7=No; FT 8=1_1; FT 9=edge;

group G2 has been identified, which corresponds to sets of data which all comprise the following feature values: FT1=RVT; FT 2=p; FT 3=3; FT 4=22; FT 5=68; FT 6=50; FT 7=Yes; FT 8=0.7_1; FT 9=edge.

These two groups are provided only as examples and more groups and/or different groups can be identified, depending on the training set of data.

For each group that was identified, the method can comprise storing, in the reduced training set of data, at least one aggregated set of data representative of at least these feature values.

Assume a group comprises M sets of data (M>1) storing given feature values.

The aggregated set of data can be e.g. a single set of data, which stores at least the given feature values. In other words, instead of storing M sets of data as in the training set of data (for which the feature values are identical or similar), the reduced training set of data can store only a single set of data comprising these feature values.

FIG. 4 represents a reduced training set of data Which can be obtained based on the training set of data of FIG. 2A. As shown, group $G_1$ is now represented by a single set of data 400 comprising feature values which are common to sets of data belonging to this group. Group $G_2$ is now represented by a single set of data 410 comprising feature values which are common to sets of data belonging to this group.

This example is however not limitative.

In some embodiments, as mentioned above, sets of data can be considered as belonging to the same group if their feature values are similar according to a similarity criterion (therefore strict equality is not required).

In this case, for a given group G, an aggregated set of data can be stored in the reduced training set of data, which comprises an aggregation of the feature values of the sets of data belonging to this given group. The aggregation can rely on a mathematical function (e.g. statistical functions) such as average, median, sum, variance, mode i.e. the most frequently observed value, or other functions.

Figures 4A, 4B:
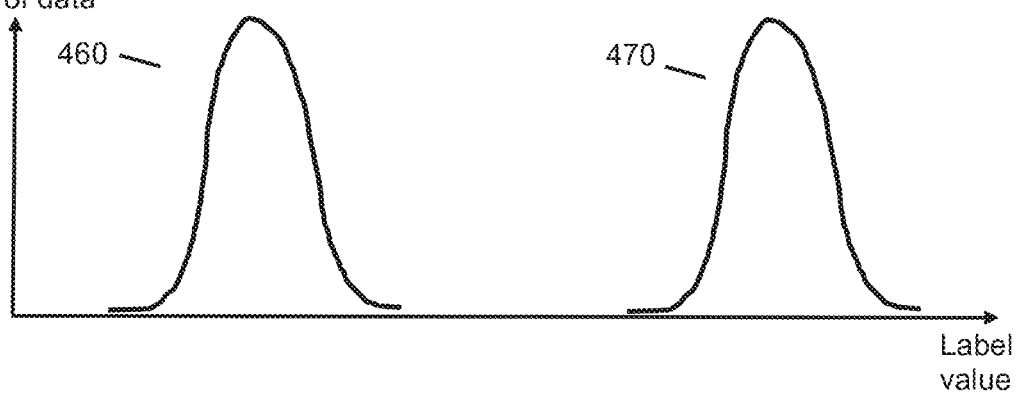
FIG. 4A represents an example of reduction of a training set into a reduced training set.
FIG. 4B represents a non-limitative example of assignment of sets of data to different groups based also on their label values.

A non-limitative example is provided in FIG. 4A. As shown, sets of data 430, 431 and 432 store similar feature values and can be viewed as belonging to the same group $G_1$, For design attribute "FT 5", there is a difference but it is below a similarity criterion (which defines e.g. a maximal relative difference of 5%).

As a consequence, the reduced training set of data stores aggregated set of data 440, which comprises for feature "FT 5" an average of all values of features of group $G_1$, and for the other features, the common value for this group.

According to some embodiments, a group of sets of data sharing similar feature values can be aggregated into more than one aggregated set of data.

A non-limitative example is provided hereinafter (see FIG. 4B).

Assume a plurality of sets of data share similar feature values according to a similarity criterion. Therefore, they can be identified as belonging to the same group of data and can be aggregated into at least one aggregated set of data.

Assume the label values of these sets of data follow a multimodal distribution, such as a bimodal distribution. In other words, a first subset 460 of the sets of data of this group is such that the label value (or label vector if a plurality of labels are present) is within a first range, and a second subset 470 of the sets of data of this group is such that the label value (or label vector) is within a second range, different from the first range.

In this case, the first subset 460 of the sets of data can be aggregated into a first aggregated set of data, and the second subset 470 of the sets of data can be aggregated into a second aggregated set of data.

More generally, according to some embodiments, a plurality of sets of data can be assigned to the same group if their feature values meet a first similarity criterion (e.g. equality, or difference below a threshold) and if their label values meet a second similarity criterion (e.g. equality, or difference below a threshold). A non-limitative example has been provided in FIG. 4B, in which the label values are concentrated around two main different values.

Figure 5:
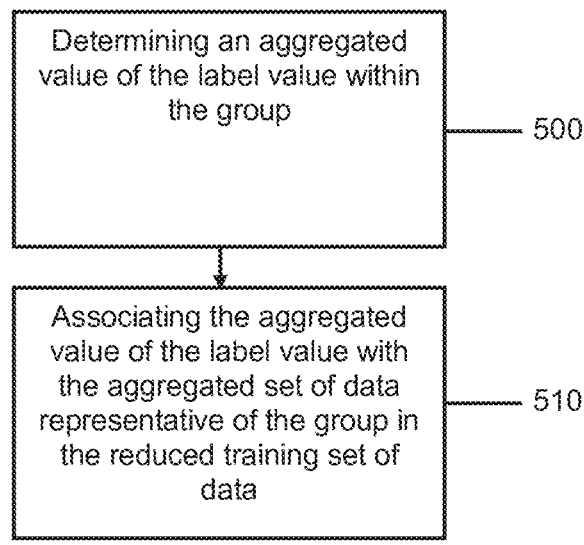
FIG. 5 describes a method of determining an aggregated value of the label value of sets of data belonging to the same group.

According to some embodiments, and as shown in FIG. 5, building the reduced training set of data can comprise (operation 500), for each group (as determined in operation 320), determining an aggregated value of the label value for all sets of data belonging to this group. This can be applied similarly for each label value if a plurality of different labels are present in the training set of data.

This aggregated value can be computed using various mathematical functions, such as statistical functions (mean value, sum, variance, etc.).

The method can comprise (operation 510) associating the aggregated value of the label value with the aggregated set of data representative of the group in the reduced training set of data. For example, this aggregated value of the label value can be stored within the aggregated set of data (as an additional variable).

A non-limitative example is provided in FIG. 4.

As already explained, the aggregated set of data 400 is representative of sets of data of the training set of data which belong to group $G_1$.

An aggregated representation 415 of the label value within this group is determined in this particular example as the sum of all label values of all sets of data belonging to the same group.

For example, for aggregated set of data 400, the aggregated label value is "69" and for aggregated set of data 410, the aggregated label value is "8". These values are not limitative.

Figure 6:
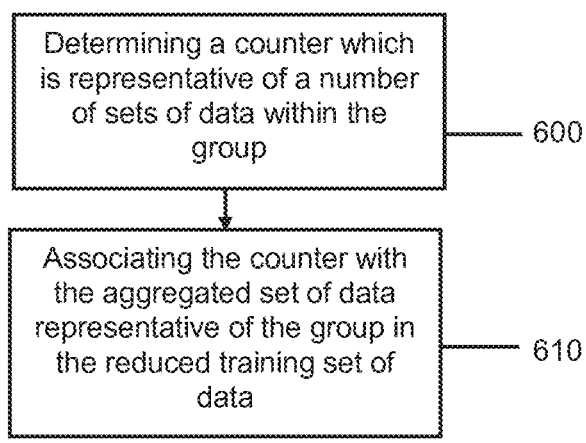
FIG. 6 describes a method of determining data representative of a number of one or more sets of data belonging to the same group.

Attention is drawn to FIG. 6.

According to some embodiments, and as shown in FIG. 6, building the reduced training set of data can comprise (operation 600), for each group (as determined in operation 320), determining data representative of a number of the one or more sets of data of the group.

In some embodiments, this data can store e.g. a count of the number of sets of data.

The method can comprise (operation 610) associating data representative of a number of the one or more sets of data of the group, with the aggregated set of data representative of this group, in the reduced training set of data.

For example, a counter can be stored within the aggregated set of data (as an additional variable).

A non-limitative example is provided in FIG. 4.

As already explained, the aggregated set of data 400 is representative of sets of data of the training set of data which belong to group $G_1$.

A counter 416 is determined in this particular example as the number of sets of data based on which the aggregated set of data was built for a group.

For example, for aggregated set of data 400, the counter value is "79,691" and for aggregated set of data 410, the counter value is "110,359". These values are not limitative.

The reduced training set of data provides an aggregated representation of the raw training set of data, while being of reduced size. In the example of FIGS. 2A and 4, the size of the raw training set of data is N=7,814,535, which was reduced to $N_{reduced}$=1,008.

According to some embodiments, a significant reduction is obtained between the training set of data and the reduced training set of data. In particular, in some embodiments, a majority of the groups comprises a plurality of sets of data, and for all of these groups, a number of aggregated sets of data is less than a number of the sets of data of the group by a magnitude of at least ten.

Figure 7:
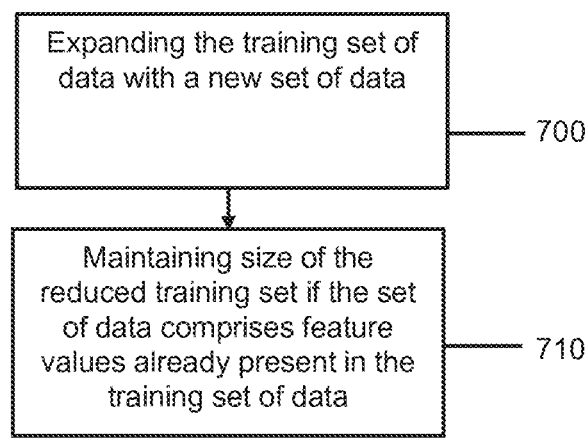
FIG. 7 describes a method in which the training set of data is expanded with a new set of data, and the number of aggregated sets of data in the reduced training set of data does not change.

Attention is drawn to FIG. 7.

The training set of data can originate from data collected from the field (e.g. manufacturing lines, test process, etc.). In some cases, the size of the training set of data can increase because new data is collected and added.

According to some embodiments, assume the training set of data was used to generate a reduced training set of data.

Assume the training set of data is expanded with new sets of data (operation 700).

If the training set of data is expanded with at least one new set of data comprising data values for the plurality of features which are already present in this training set of data, then the number of aggregated sets of data in the reduced training set of data does not increase (operation 710).

Indeed, since feature values of this new set of data are already present in the training set of data, this means that an aggregated set of data representative of these feature values is already present in the reduced training set of data, and therefore, only the counter associated to this aggregated set of data will change to take into account this new set of data. In some embodiments, the aggregated representation of at least one label value may also change to take into account the label value of this new set of data.

This new set of data can correspond to:

a new set of data for which a set of data comprising the same feature values is already present in the training set of data (but label value can be different); and/or a new set of data for which a set of data comprising similar feature values is already present in the training set of data (but label value can be different). This similarity is assessed according to the similarity criterion mentioned above.

An example is provided with reference to FIGS. 2A and 4. Assume the training set of data is expanded with a new set of data defined as follows: FT 1=RVT; FT 2=p; FT 3=3; FT 4=22; FT 5=68; FT 6=50; FT 7=Yes; FT 8=0.7_1; FT 9=edge, LA1=0.

Since features values of this set of data are already present in the training set of data (see row 205 in FIG. 2A), the number of aggregated sets of data in the reduced training set of data does not increase. Indeed, this new set of data will be identified in operation 320 as belonging to existing group $G_2$, which is represented by aggregated set of data 410 in the reduced training set of data. Only the counter 416 will be modified but this does not increase the number of aggregated sets of data in the reduced training set of data. Since the label value of this new set of data is equal to zero, the aggregated fail count 415 does not change in this specific example.

As mentioned above, the same applies to a new set of data which is identified as being similar to a set of data belonging to an existing group.

Various embodiments for determining a relationship between the at least one label and the features of the electronic items (in particular based on the reduced training set of data) will be provided.

Figure 8:
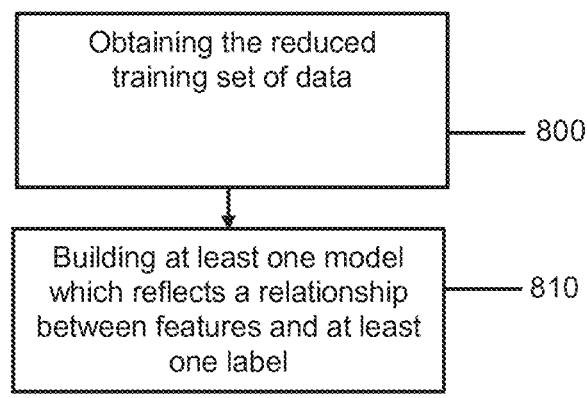
FIG. 8 describes a method of using the reduced training set of data to build at least one model which reflects a relationship between features and at least one label.

As shown in FIG. 8, the method can comprise obtaining (operation 800) a reduced training set of data (as explained in the various embodiments above, this reduced training set of data is built from a training set of data of larger size).

The method can comprise (operation 810) building at least one model based on this reduced training set of data, using a classification algorithm. This model establishes a relationship between features and at least one label.

An example of a classification algorithm that can be used is random forest model. This is however not limitative, and other algorithms, such as regression model, equational model, neural network model or any appropriate models which correlate feature data with label data.

This model can comprise at least one decision tree.

A decision tree comprises a plurality of nodes organized in hierarchical layers. At each node, it is attempted to split the data according to one feature and its value, with respect to a split criteria. The split criteria can indicate to what extent the feature and its value influence the label. It indicates which feature values are the "most descriptive" for the label and allow classifying the label the most efficiently.

An end node is reached e.g. when the data cannot be split further with respect to the split criteria.

Figure 9:
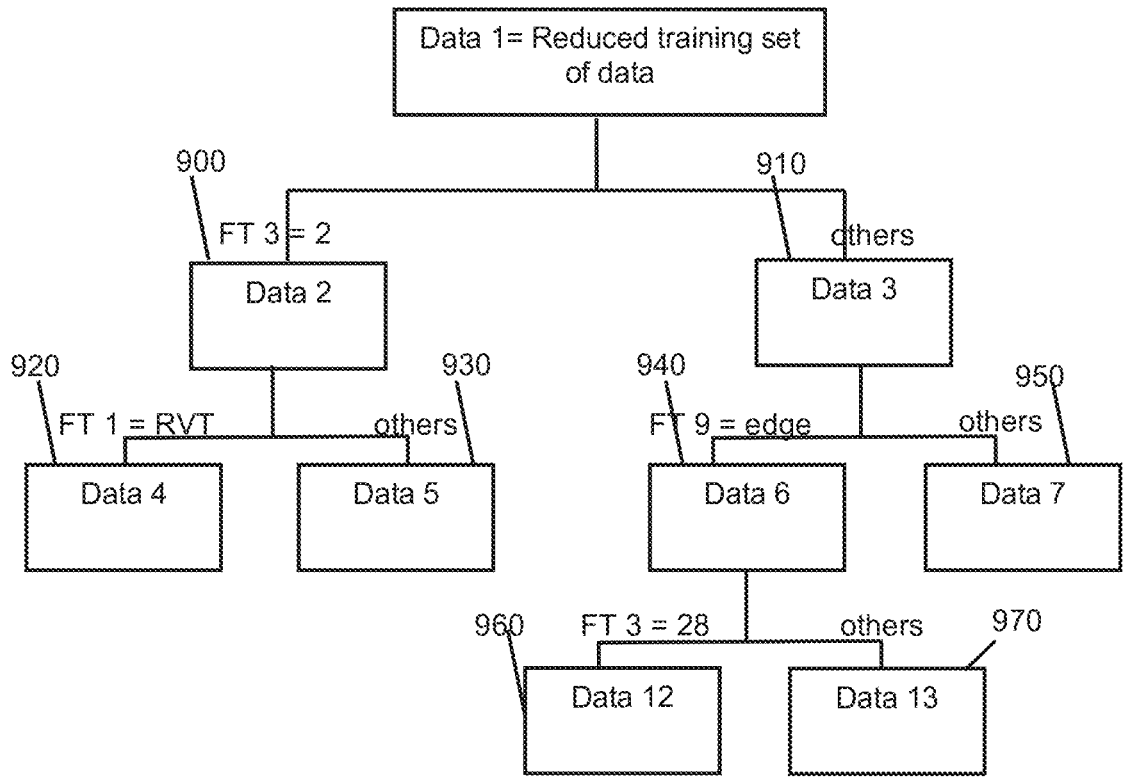
FIG. 9 describes a non-limitative example of a decision tree which can be built using the method of FIG. 8.

A non-limitative example is provided in FIG. 9.

As shown, a reduced training set of data (corresponding to the example of FIG. 4) is fed to a classification algorithm.

It is attempted to split the data of a parent node into two subsets (left child node, right child node): the different feature values are each tested and the feature value which provides the data split which complies the best with the split criteria is determined.

In the example of FIG. 9, design attribute "FT 3", with a value of "2", was identified as the best feature value for splitting the data of the parent node (Data 1).

Therefore, left node 900 is associated with all sets of data that comprise FT 3=3, whereas right node 910 is associated with all other sets of data.

The same process is repeated.

It is attempted to split data associated with the left node 900 as the data of parent node into further two subsets (left child node, right child node): the different feature values are each tested and the feature value which provides the data split which complies the best with the split criteria is determined.

As shown, design attribute "FT 1", with a value of "RVT", was identified as the best feature value for splitting the data.

Therefore, left node 920 is associated with all sets of data that comprise FT 1=RVT, whereas right node 930 is associated with all other sets of data.

Data associated to nodes 920 and 930 cannot be split further according to the split criteria.

The same process is performed for node 910. At the end of the process, nodes 940, 950, 960 and 970 are obtained.

According to some embodiments, the split criteria can rely on a Gini index ($G_1$) reduction, on variance, etc. Although an example is described with a single label, this can be applied to a plurality of labels which are represented by a vector of labels.

A non-limitative example of a split criteria is provided below.

The split criteria can rely on a $G_1$ reduction which is given by $\Delta G_1$:

$$\Delta G_1 = G_1(M) \cdot n(M) - G_1(L) \cdot n(L) - G_1(R) \cdot n(R)$$

where:

$G_1(M)$, $G_1(L)$ and $G_1(R)$ are respectively $G_1$ before data split (i.e. $G_1$ of data associated to parent node), $G_1$ of left split data ($G_1$ of data associated to left child node) and $G_1$ of right split data ($G_1$ of data associated to right child node);

n(M), n(L) and n(R) are respectively data count before split (i.e. data count of data associated to parent node), data count of left split data (data count of data associated to left child node) and data count of right split data (data count of data associated to right child node).

In addition, $G_1$ can be defined as follows:

$G_1$=1−(statistical rate to observe a representative label value of the data)◯2−(1−statistical rate to observe a representative label value of the data)◯2

In the particular example of FIG. 9, in which the label is a fail or a pass (fail can be considered as a representative label value), $G_1$ can be defined as follows:

$G_1$=1−(fail rate of the data)◯2−(1−fail rate of the data)◯2=1−(fail count/data count)◯2−(1−fail count/data count)◯2.

A small $G_1$ corresponds to the fact that the split data is less mixed with fail and non-fail data (i.e. data is purer), and a large $G_1$ corresponds to the fact that the split data is more mixed with fail and non-fail data (i.e. data is less pure).

According to some embodiments, all the feature values are tested one by one for data split trial to evaluate $G_1$ reduction.

Then, the feature value which gives the largest $G_1$ reduction can be selected as the criteria for splitting data into left and right children nodes.

The building of the decision tree can use various techniques, which are not limited to the one described above.

This decision tree can be used for various applications as explained hereinafter.

In some embodiments, a plurality of reduced training sets of data are built based on the training set. These plurality of reduced training sets of data can be used to build one or more models which reflect a relationship between the features and at least one label. Embodiments will be described hereinafter in which these plurality of reduced training sets of data can be used.

Figure 10:
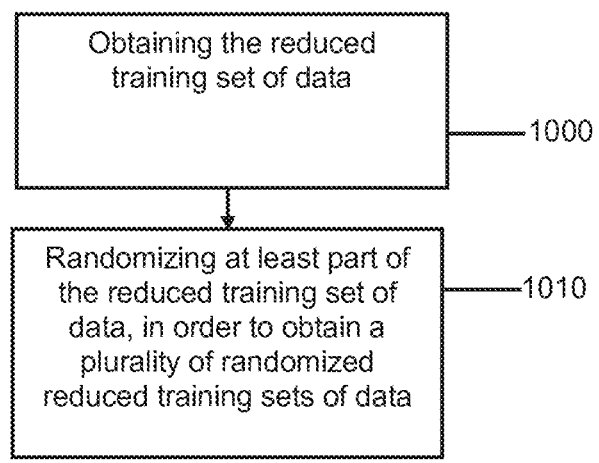
FIG. 10 describes a method of obtaining a plurality of reduced training sets of data, by randomization of a reduced training set of data.

Attention is drawn to FIG. 10 which describes a method of building various reduced training sets of data based on the reduced training set of data.

These various reduced training sets of data can be used as an input of a classification algorithm implementing decision trees, in order to build a plurality of different decision trees, thereby determining a relationship between features and label.

A known classification algorithm which can be used is the so called random forest algorithm. Other algorithms include regression model, bugging model, decision tree model, association rule model, neural network model, etc.

In applying some model algorithm, each set of data (i.e. row) in the reduced training set of data can be weighted by its counter (i.e. data count) when it is injected in the modeling algorithm as needed.

Once the reduced training set of data has been obtained (operation 1000, based on the various embodiments described above), the method can comprise randomizing (operation 1010) at least part of the reduced training set of data to obtain a randomized reduced training set of data.

This randomization can be performed a plurality of times on the reduced training set of data, thereby providing each time (after each randomization) a different randomized reduced training set of data.

Figure 11:
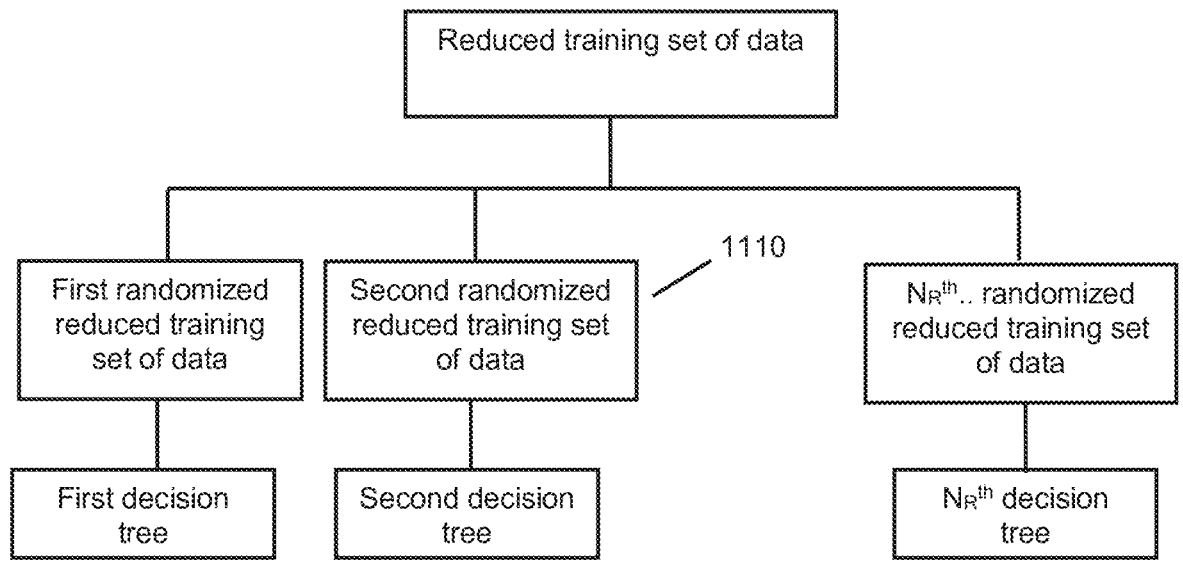
FIG. 11 describes a method of using the plurality of randomized reduced training sets of data for establishing a relationship between features and labels.

In the example of FIG. 11, the reduced training set of data is randomized $N_R$ times, thereby providing $N_R$ randomized reduced training sets of data (see reference 1110). Each randomized reduced training set of data can be fed into a classification algorithm implementing one or more decision trees, such as random forest.

In particular, each randomized reduced training set of data can be used to build a decision tree. Building of the decision tree can be performed using e.g. the method described with reference to FIGS. 8 and 9.

Figure 12:
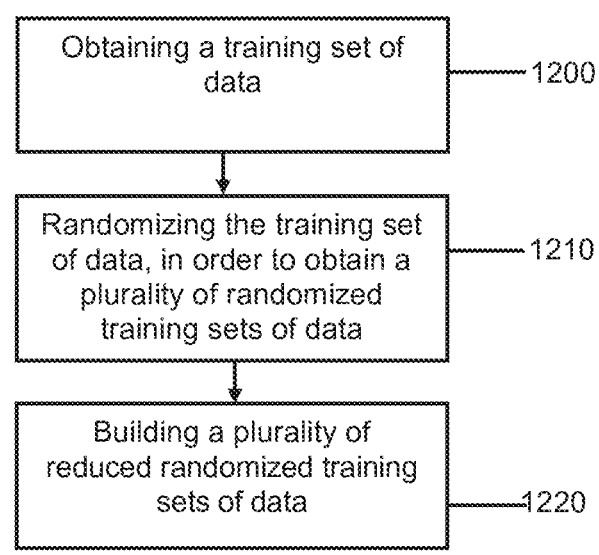
FIG. 12 describes another method of obtaining a plurality of reduced training sets of data, by first randomizing the training set of data and then reducing the size.
Figure 13:
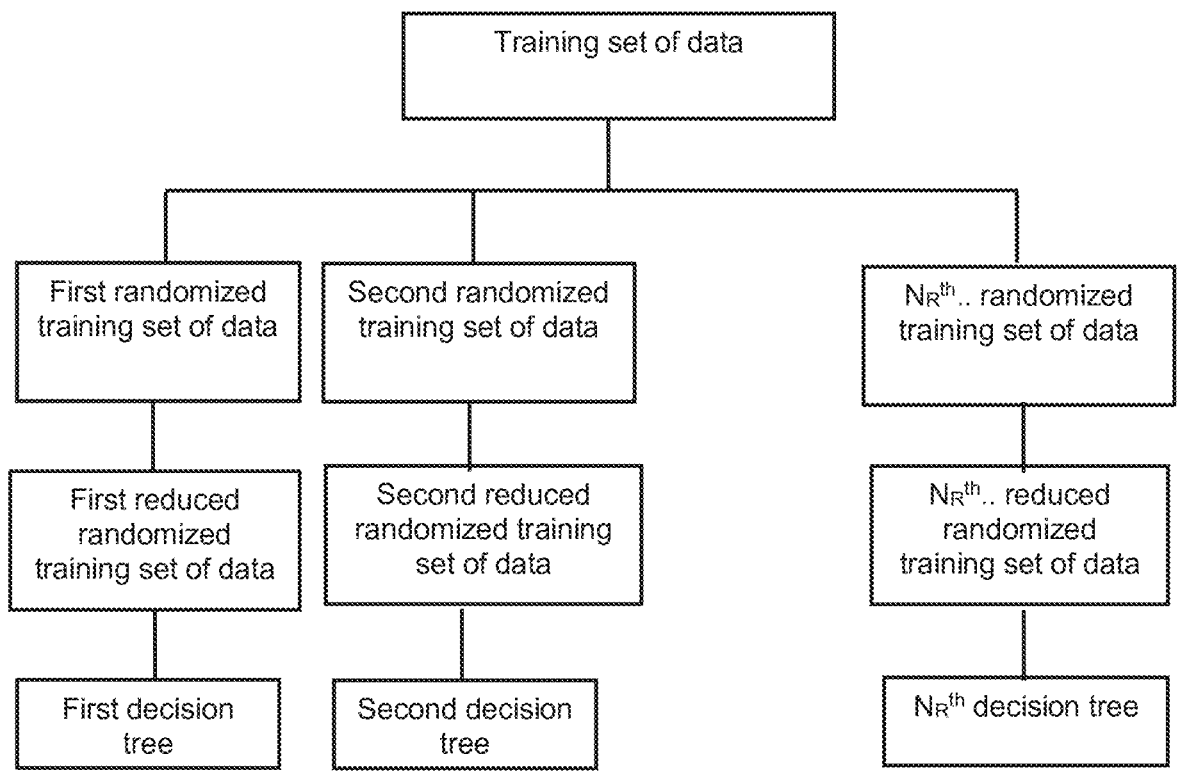
FIG. 13 illustrates a diagram reflecting an application of the method of FIG. 12.

FIGS. 12 and 13 describe another approach to build a plurality of randomized reduced training sets of data (which can be used in a classification algorithm for building a plurality of decision trees for determining a relationship between the at least one label and the features of the electronic items).

The method can comprise obtaining a training set of data (operation 1200, which is similar to operation 300 described above).

The method can comprise randomizing the training set of data, in order to obtain a plurality of randomized training sets of data (operation 1210). Each of the randomized training sets can have the same size as the training set (that is to say that it can comprise the same number of sets of data at this stage, size reduction of the training set has not been performed).

In the example of FIG. 13, Na randomized raw training sets of data are obtained.

The method can comprise building a plurality of reduced randomized training sets of data (operation 1220).

In other words, each randomized training set of data can be reduced into a reduced randomized training set of data, using the various methods already described above e.g. FIG. 3).

In the example of FIG. 13, $N_R$ reduced randomized training sets of data are obtained.

As shown in FIG. 13, each reduced randomized training set of data can be used in a classification algorithm, in order to build a different model (e.g. decision tree) which reflects a relationship between the features and the label.

Figure 14:
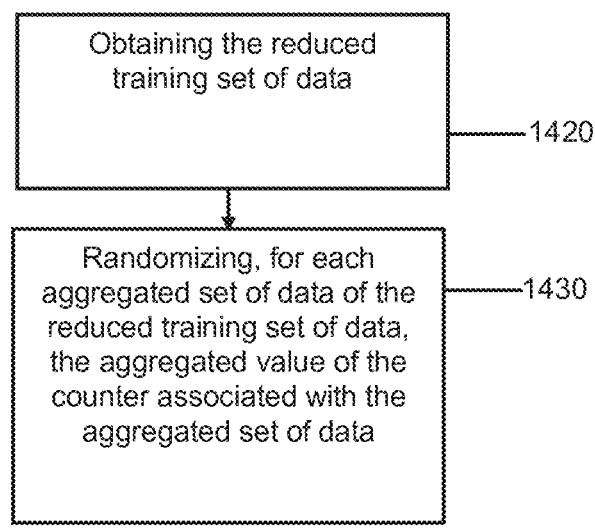
FIG. 14 describes a method of randomizing the aggregated value of the counter associated with the aggregated set of data.

Attention is now drawn to FIG. 14, which describes a method of randomizing the reduced training set of data. This method can be used e.g. in the embodiment described in FIG. 11.

As shown, the method comprises obtaining the reduced training set of data (operation 1420), and randomizing, for each aggregated set of data of the reduced training set of data, the aggregated value of the counter associated with the aggregated set of data (operation 1430).

Figure 14A:
FIG. 14A describes an example of the method of FIG. 14.

An example is shown in FIG. 14A, in which it is shown that new values (after randomization) for the counter have been obtained in the randomized reduced training set of data.

This process can be performed several times in order to obtain a plurality of different randomized reduced training sets of data.

Figure 14B:
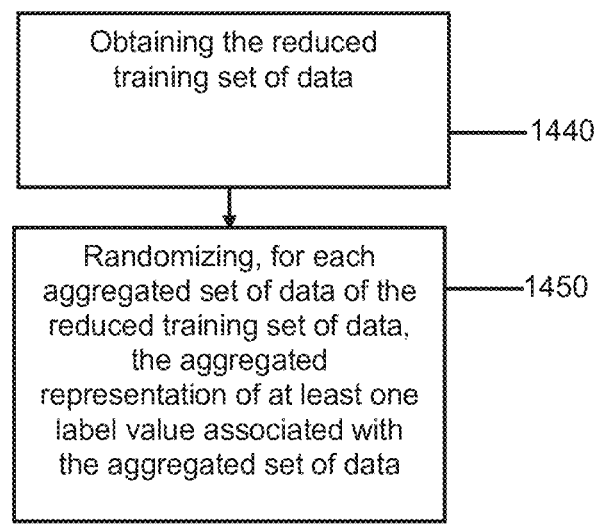
FIG. 14B describes a method of randomizing the aggregated representation of at least one label value associated with the aggregated set of data.

Another embodiment of a randomizing method is described with reference to FIG. 14B.

As shown, the method comprises obtaining the reduced training set of data (operation 1440), and randomizing, for each aggregated set of data of the reduced training set of data, the aggregated representation of at least one label value associated with the aggregated set of data (operation 1450).

Figure 14C:
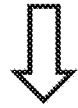
FIG. 14C describes a non-limitative example of the method of FIG. 14B.
Figure 14D:
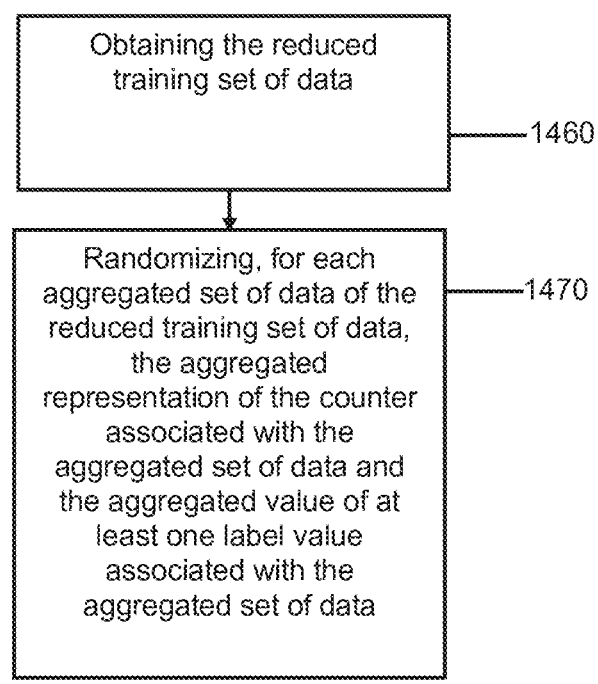
FIG. 14D describes a method of randomizing the aggregated representation of at least one label value associated with the aggregated set of data and the aggregated value of the counter associated with the aggregated set of data.

An example is shown in FIG. 14C, in which it is shown that new values (after randomization) for the label have been obtained in the randomized reduced training set of data.

This process can be performed several times in order to obtain a plurality of different randomized reduced training sets of data.

The randomization of the aggregated representation of the label value can be performed even if the aggregated representation of the counter has not been randomized. Similarly the aggregated representation of the counter can be randomized even if the aggregated representation of the label value has not been randomized.

Another embodiment of the method is described with reference to FIG. 141), which combines the method of FIGS. 14 and 14B.

As shown, the method comprises obtaining the reduced training set of data (operation 1460), and randomizing, for each aggregated set of data of the reduced training set of data, the aggregated representation of at least one label value of the one or more sets of data of the group, and the aggregated value of the counter associated with the aggregated set of data (operation 1470).

Figure 14E:
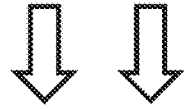
FIG. 14E describes a non-limitative example of the method of FIG. 140.

An example is shown in FIG. 14E, in which it is shown that new values for the label and for the counter have been obtained in the randomized reduced training set of data.

This process can be performed several times in order to obtain a plurality of different randomized reduced training sets of data.

Figure 15:
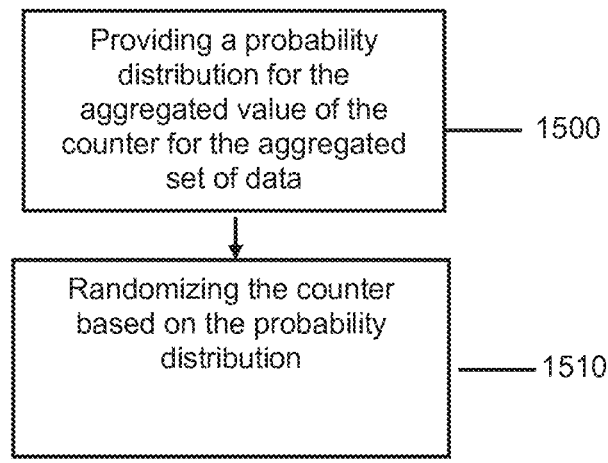
FIG. 15 describes a possible embodiment for performing the method of FIG. 14.

Attention is now drawn to FIG. 15 which provides a method which can be used for randomizing the aggregated counter in the reduced training set of data.

This method can comprise providing, for each set of data, a probability distribution to have a certain counter after randomizing (operation 1500).

Assume the reduced training set of data comprises $N_{reduced}$ sets of data.

For a certain aggregated set of data, probability distribution to have a certain counter value (data count) "in" after random sampling from raw data (training set of data) can be defined by binomial distribution $P(m, p, N)$:

$$P(m, p, N) = {_N}C_m \cdot p^m \cdot (1-p)^{N-m} \qquad \text{(Equation 1)}$$

In this Equation 1:
m: counter value (data count) to be observed in this aggregated set of data (variable);
N: entire data count (fixed);
p: data count ratio of this aggregated set of data with respect to the entire data count (fixed);
${_N}C_m = !/\{(N-m)! \cdot m!\}$ (variable).

For example, in case of the set of feature values in $5^{th}$ row in the reduced training set of data in FIG. 14E, we obtain:
N=7,814,535 (=entire data count in reduced training set of data, i.e. sum of "data count" column);
p=2,990/7,814,535 (=data count of $5^{th}$ row/N).

Then, the probability distribution can be calculated for each data count m by Equation 1. Center of the probability distribution generally coincides with the true value of the data count for this aggregated set of data.

Figure 15A:
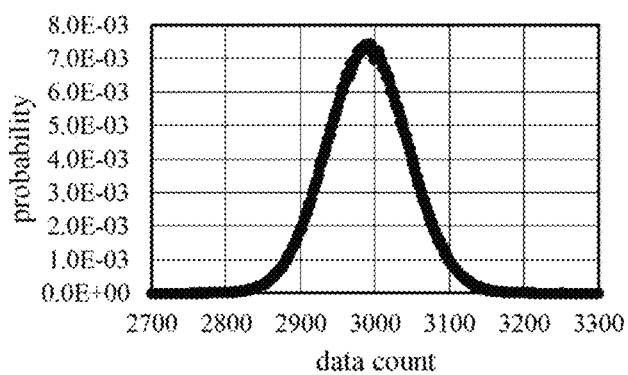
FIG. 15A illustrates a probability function which can be computed in the method of FIG. 15.

A non-limitative example is provided in FIG. 15A.

If the reduced training set of data comprises $N_{reduced}$ different aggregated sets of data, then $N_{reduced}$ different probability distributions can be obtained.

A randomized counter value in can be obtained (see operation 1510) using this probability distribution (a value can be selected randomly on the curve for which the probability distribution is non-zero).

For example, in FIGS. 14E, m=3,043 is obtained after randomization. This is not limitative.

In practice, to obtain the randomized counter value m, a random number generator can be used in which the following data can be injected: p, N, P vs m relation (e.g. Equation 1).

In some embodiments, the sampling size may be also injected in the random number generator.

The sampling size is the count of random numbers to generate, i.e. how many times the reduced training data is planned to be randomized. In this case, this is provided by $N_R$ (number of randomized reduced training sets of data to be generated) in FIG. 11.

In some random number generators, P vs m relation is not required to be injected if it is automatically computed based e.g. on Equation 1 or any other equations or rules which correlate P and m.

Operation 1510 can be repeated in order to obtain, for a given aggregated set of data, a plurality of randomized counter values (each one stored in another randomized reduced training set of data). Operation 1510 can be performed for each given aggregated set of data of the reduced training set of data.

If randomization is performed on the raw training set of data (and not on the reduced training set of data) as explained in FIGS. 12 and 13, the method of FIG. 15 can be applied similarly to each set of data of the raw training set of data. In this case, each set of data of the raw training set of data is associated with a counter equal to one (since each set of data has not yet been assigned to a group), and this value can be randomized using the method of FIG. 15.

In other embodiments, random sampling (also called "bootstrap", if the random sampling is done until the collected data reaches the same data count of the sampling source data) be performed on the raw training set of data. The rows of the raw training set of data are selected randomly, i.e. by the same probability for any row, until the count of collected rows reaches the row count of the original raw training set of the data (N). In this case, duplicated sampling is allowed, which means that the same row can be collected multiple times while some other rows are not collected at all.

After random sampling (i.e. bootstrap), a reduced training set of data can be generated from each of the randomly sampled raw training sets of data (using e.g. the various methods described above for computing a reduced training set based on a raw training set of data.

In some embodiments, a random sampling method can be used to both randomize and reduce the original raw training set of data, if random sampling is performed on the raw training set of data to collect rows which total number is less than the row count of the original raw training set of data (N). For example, random sampling to collect up to N/2 sets of data reduces the data size to half of the original raw training set of data.

Figure 16:
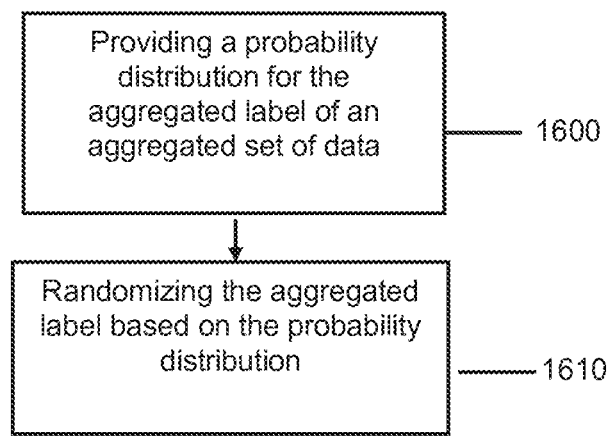
FIG. 16 describes a possible embodiment for performing the method of FIG. 14B.

Attention is now drawn to FIG. 16 which provides a method which can be used for randomizing the aggregated label of each aggregated set of data.

This method can comprise providing, for each set of data, a probability distribution to have a certain label after randomizing (operation 1600).

Assume the reduced training set of data comprises $N_{reduced}$ aggregated sets of data.

For a certain aggregated set of data, probability distribution to have a certain label (in this example fail count) "n" after random sampling from raw data can be defined by binomial distribution $P(n, r, m)$:

$$P(n, r, m) = {_m}C_n \cdot r^n \cdot (1-r)^{m-n} \qquad \text{(Equation 2)}$$

In this Equation 2:
n: fail count to be observed in the randomized data;
m: obtained randomized data count (see Equation 1);
r: fail count ratio of the aggregated set of data before randomizing; and
${_m}C_n = m!/\{(m-n)! \cdot n!\}$ For example, in case of the aggregated set of data in the $5^{th}$ row in the reduced training set of data in FIG. 14E, we obtain:
m=3,043 (=randomized data count, obtained above); and
r=15/2,990 (=fail count/data count of the $5^{th}$ set of data).

Figure 16A:
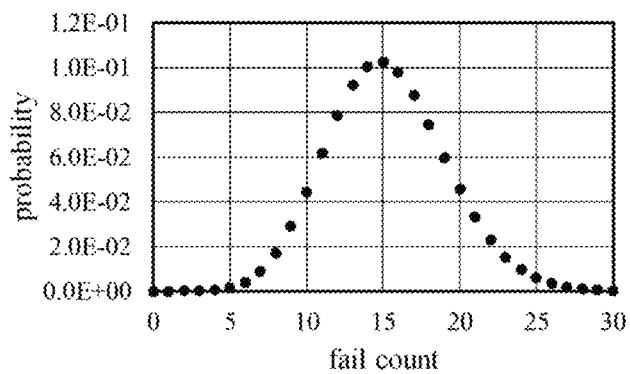
FIG. 16A illustrates a probability function which can be computed in the method of FIG. 16.

Then, the probability distribution can be calculated for each data count n by Equation 2. Center of the probability distribution generally coincides with the aggregated representation of at least one label value of the aggregated set of data. A non-limitative example is provided in FIG. 16A.

A randomized aggregated label value n can be obtained (see operation 1610) using this probability distribution (a value can be selected randomly on the curve for which the probability distribution is non-zero).

For example, in FIG. 14E, n=18 is obtained after randomization for the $5^{th}$ aggregated set of data of the reduced training set of data.

In practice, a random number generator can be used in which at least the following data are injected: r, N, P vs n relation (e.g. Equation 2). In some embodiments, the sampling size can be injected as already explained above. The relation P vs n is not required in some embodiments, as explained above in the method of generating a randomized aggregated counter.

Operation 1610 can be repeated in order to obtain, for a given aggregated set of data, a plurality of randomized label values (each one stored in another randomized reduced training set of data). Operation 1610 can be performed for each given aggregated set of data of the reduced training set of data.

Although an example has been described with a single label, the method can be applied similarly to each label if a plurality of labels are present.

If randomization is performed on the raw training set of data (and not on the reduced training set of data) as explained in FIGS. 12 and 13, the method of FIG. 15 can be applied similarly to each set of data of the raw training set of data. In this case, each set of data of the raw training set of data is associated with a label, and this value is randomized using the method of FIG. 16.

In the method described with respect to FIGS. 15 and 16, specific formula for computing probability distribution (see Equations 1 and 2) have been provided in order to randomize the reduced training set of data. For the type of aggregated representation of the label value i.e. data count and fail count, a Binomial distribution (see Equations 1 and 2) function was applied.

This is however not limitative, and in some embodiments, other known functions can be used depending on the type of aggregated representation of label value and assumed statistical model. For example, normal distribution, gamma distribution, beta distribution, (if the aggregated representation should be provided with continuous probability distribution), binomial distribution, Bernoulli distribution, Poisson distribution, (if it is provided with discrete probability distributions), t-distribution, chi-squared, F distribution (if it is statistical inference), etc. can also be provided.

In some embodiments, other randomization methods can be used to randomize the reduced training set of data (e.g. boot strap, etc.).

As explained above with respect to FIGS. 12 and 13, the plurality of randomized reduced training sets of data can be built using another approach, in which the training set of data is first randomized into a plurality of randomized training sets of data (therefore the size of each randomized training set of data is not reduced with respect to the training set of data), and then each randomized training set of data is reduced.

The randomization performed in this approach can be performed using various methods. Non-limitative examples are provided below, but other methods can be used.

According to some embodiments, a bootstrap method can be used.

According to some embodiments, rows of the training set of data are selected randomly, and redundant sampling is authorized. For example, a first row of the training set of data is selected randomly from the training set of data, but remains present in the training set of data. Then, a second row of the training set of data is selected randomly, while remaining present in the training set of data, and so on. Therefore, the randomized training set of data comprises rows selected randomly from the training set of data. Some rows of the training set of data can be present more than once in the randomized training set of data, while some rows are not present.

According to some embodiments, only a subset of the rows of the training set of data are selected randomly.

Figure 17:
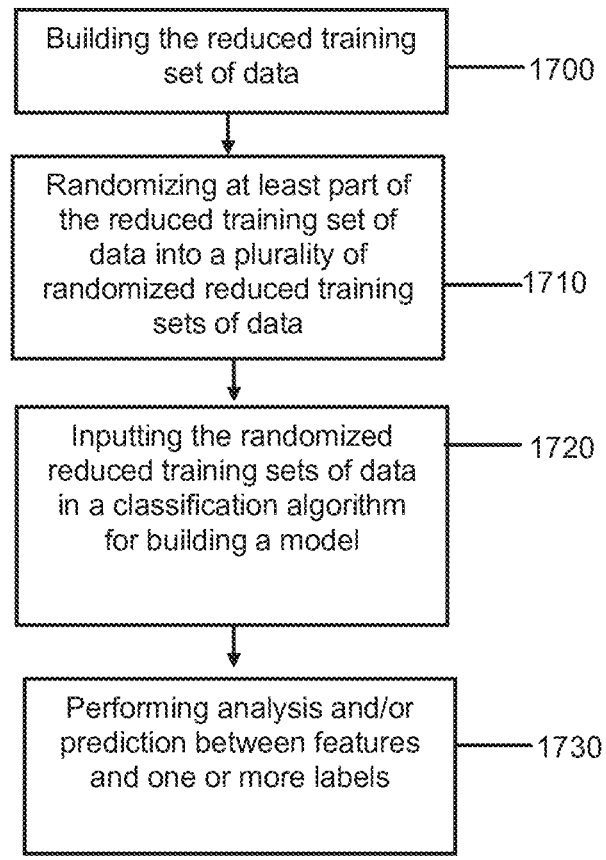
FIG. 17 depicts a method of determining a relationship between the at least one label and the features of the electronic items, and using this relationship in prediction and/or analysis of the electronic items.

Attention is now drawn to FIG. 17, which depicts a method of determining a relationship between the at least one label and the features of the electronic items, and using this relationship in prediction and/or analysis of the electronic items.

The method comprises obtaining (operation 1700) the reduced training set of data (see above various methods for building this reduced training set of data).

The method can comprise randomizing at least part of the reduced training set of data into a plurality of randomized reduced training sets of data (operation 1710—various methods have been provided above).

The method can comprise inputting the randomized reduced training sets of data into a classification algorithm (e.g. implementing one or more decision trees—operation 1720) for building a model. For example, a random forest algorithm can be used to determine relationship between features and label(s). Other algorithms include regression model, bugging model, decision tree model, association rule model, neural network model, etc. In applying some model algorithm, each set of data (i.e. row) in the reduced training set of data can be weighted by its counter (i.e. data count) when it is injected in the modeling algorithm as needed.

If a plurality of different labels are present, the model reflects the relationship between features and the different labels.

In some examples, a model comprising a plurality of decision trees can be obtained. According to some embodiments, 500 or more decision trees are built (based on 500 randomized reduced training sets of data). This is however not limitative.

Figure 18:
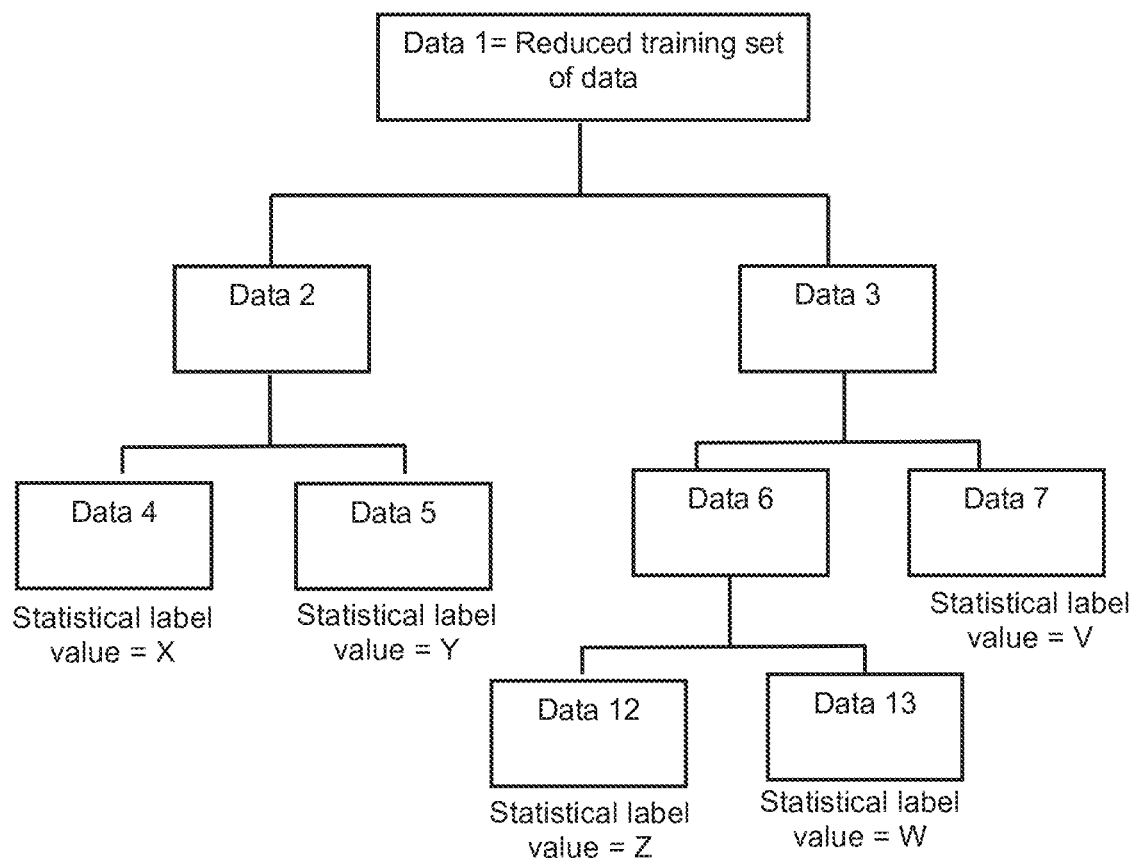
FIG. 18 illustrates a model which can be built in the method of FIG. 17.

Each decision tree can reflect a relationship between features and labels. For example, for each end node of the decision tree, data representative of the label of the sets of data associated with this end node can be calculated. This can comprise e.g. an average label value, or other statistical data such as average, median, sum, variance, mode i.e. the most frequently observed value, etc. This is shown in FIG. 18.

The method can comprise performing analysis and/or prediction between features and label using the model built by the classification algorithm (operation 1730).

Non-limitative applications of the method are provided hereinafter.

According to some embodiments, assume a classification algorithm has been used to establish a relationship between features and label.

A method can comprise (see operation 1900 in FIG. 19) obtaining a set of feature values (for example in order to improve design/conception of an electronic item). It is desired to predict the label for this set of feature values (for example to predict whether these feature values improve performance or not).

Figure 19:
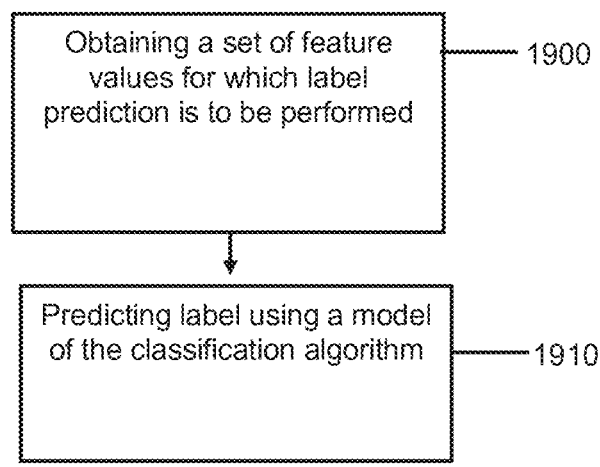
FIG. 19 illustrates a method of predicting one or more labels for a given set of feature values.

The method can comprise querying the model built using the classification algorithm (this model comprises the various decision trees of the classification algorithm) in order to predict the label (or data representative of this label) for this set of feature values (operation 1910 in FIG. 19).

The model can e.g. search the decision tree(s) based on the set of feature values. Once an end node is reached, the corresponding label (or statistical value representative of this label, such as e.g. label value divided by the counter) associated with the end node can be extracted, and output as a prediction for this set of feature values.

If a plurality of decision trees have been built, the output of each decision tree can be aggregated to provide a prediction of the label. This aggregation can comprise computing a mean value.

For example, a set of manufacturing data (features) of an electronic device is provided and it is desired to predict the failure rate of this electronic device.

Assume the reduced training set of data stores, for each set of data, an aggregated label which is a fail count (sum of all fail output for similar sets of data) and a counter (number of sets of data which have similar features). An example is provided in FIG. 4.

Following the building of the decision trees, each end node is associated with a plurality of sets of data. A fail rate ratio of an end node can be calculated as the sum of tail count (for all data associated to the end node) divided by sum of data count (for all data associated to the end node). This provides a statistical indication of failure rate for sets of data having features which are associated with this end node.

When a list of manufacturing data is provided, the method can comprise searching each of the decision trees with the corresponding features. For each decision tree, an end node is reached and a corresponding fail rate is extracted. An aggregation of all results of all decision trees can provide a prediction of the fail rate for these manufacturing data.

Figure 20:
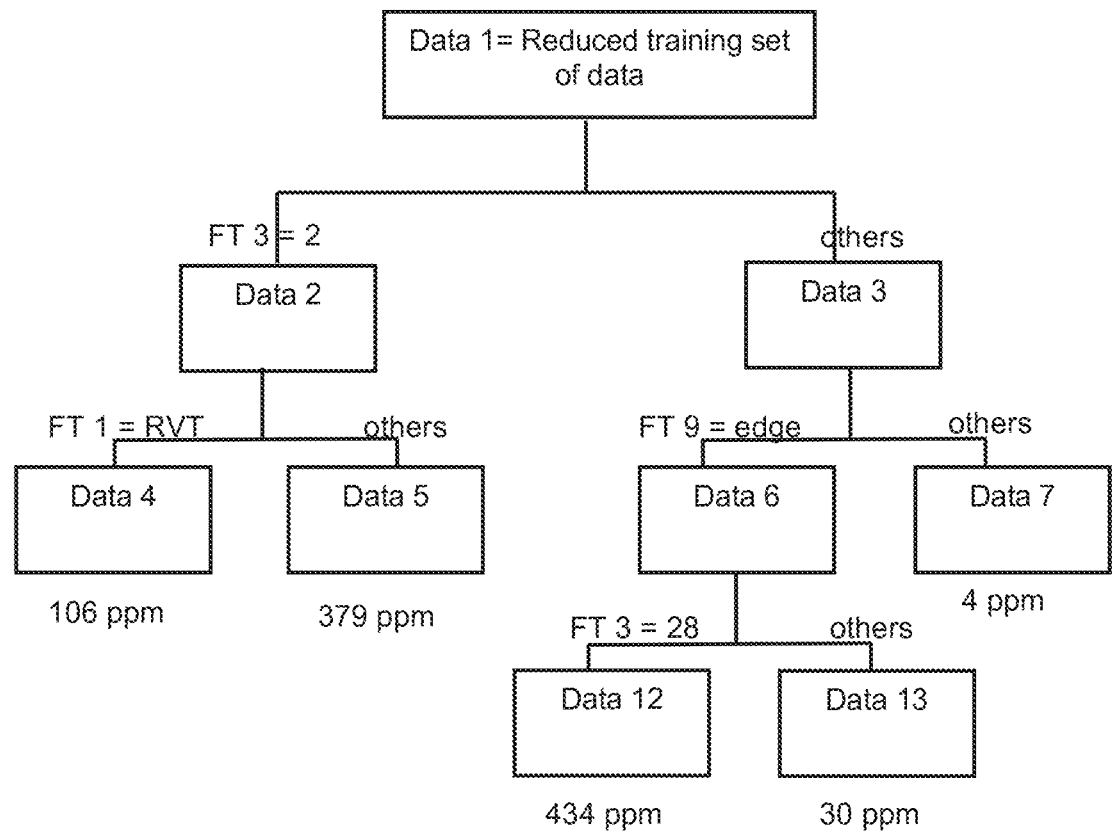
FIG. 20 illustrates a non-limitative example of the method of FIG. 19.

A numerical example is provided in FIG. 20. Assume a transistor comprises the following manufacturing data: location=edge and fin count=28. i.e. FT9=edge and FT3=28.

Using the decision tree, end node associated with "data 12" is reached. It can be predicted that the fail rate of such a transistor should be 434 ppm.

According to some embodiments, a method can comprise using the model which was built to identify and rank the influence of each feature (e.g. manufacturing data) on the label (e.g. fail rate).

In some embodiments, the relationship between the features and the label which was built using the classification algorithm can be used to determine an importance of one or more features with respect to at least one label, the importance being representative of a level of contribution of the features in the at least one label.

A more specific definition (but not limitative) of the importance of a feature is provided in the article "IBE Transactions on Smart Processing and Computing", vol. 5, no, 5, Oct. 2016, Random Forest Model for Silicon-to-SPICE Gap and FinFET Design Attribute Identification (see paragraph 3.2, equation 8). This document is incorporated within by reference.

In some embodiments, the relationship between the features and the label which was built using the classification algorithm can be used to determine an impact of one or more features with respect to the at least one label, the impact being representative of whether the one or more features increase or decrease the at least one label.

A more specific definition (but not limitative) of the impact of a feature is provided in the article cited above (see paragraph 3.2, equation 9).

According to some embodiments, a method of determining a relationship between features and label can be performed using data collected on a manufacturing line. In particular, the model can be updated during manufacturing of the electronic items. This update can be performed with a short response time, in particular due to the fact that the training set is reduced into a reduced training set, as explained in the various embodiments described above.

The training set data is collected from at least operational data collected from at least a manufacturing line of one or more electronic items. The method comprises determining a relationship between the at least one label and one or more of the features for the one or more electronic items, and updating this relationship based on an update of the operational data during manufacturing.

Figure 21:
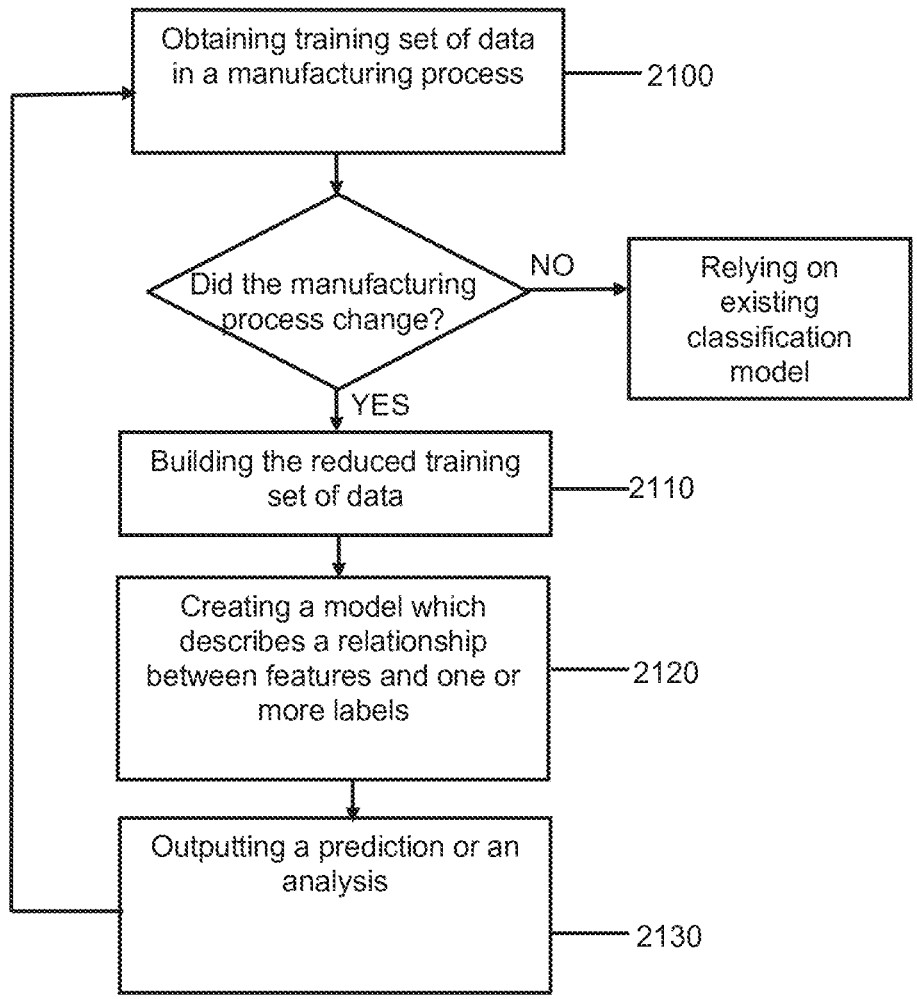
FIG. 21 illustrates a method of building a model describing a relationship between features and one or more labels in a manufacturing line.

An example is provided in FIG. 21.

As shown in FIG. 21, the method can comprise obtaining (operation 2100) a training set of data in a manufacturing process.

The training set of data is reduced (operation 2110), using the various embodiments described above, and the reduced training set of data is used to build a model which describes a relationship between features and label (operation 2120).

When the manufacturing process does not change, the same model can be used. When the manufacturing process changes, then a new model can be built using the new received data. In particular, the training set incorporating this new received data can be reduced and processed, as explained in the various embodiments above, to build a model.

The model can used for prediction and/or analysis of performance of the electronic items (operation 2130). It can be used also to adjust or improve the manufacturing process.

Since the model is built based on the reduced training set of data, computation time and load are reduced, thereby offering flexibility and short reaction time, which are adapted to the constraints of a manufacturing line.

The example of a manufacturing line is not limitative, and the various embodiments can be used for various applications in order to assess performance of electronic items, predict performance/failure rate of electronic items, improve manufacturing process, etc.

It is to be noted that the various features described in the various embodiments may be combined according to all possible technical combinations.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as herein before described without departing from its scope, defined in and by the appended claims.

The invention claimed is:

1. A method comprising, by a processing unit coupled to a non-transitory computer-readable memory medium:
   obtaining a training set of data comprising a plurality of sets of data each representative of an electronic item, each set comprising feature values for a plurality of features, and for at least one label;
   building a reduced training set of data which comprises an aggregated representation of the training set of data, the building comprising:
      dividing the sets of data into a plurality of groups, wherein each set of data is assigned to one group, wherein all sets of data for which the feature values meet at least one similarity criterion are in the same group, wherein the at least one similarity criterion comprises feature values for at least one feature not differing by more than a threshold amount between sets of data of the group, storing in the reduced training set of data, for each group, an aggregated set of data comprising:

an aggregated representation of feature values for the sets of data of the group, wherein the aggregated representation of feature values comprises an average of the feature values for the sets of data of the group, an aggregated representation of at least one label value of the sets of data of the group, wherein the aggregated representation of the at least one label value comprises a sum of label values for the sets of data of the group, and a number of sets of data of the respective group, wherein the number of sets of data is less than the total number of sets of data of the respective group; and randomizing the number of sets of data of each of the plurality of groups of the reduced training set of data a plurality of times in order to obtain a plurality of randomized reduced training sets of data, wherein randomizing the number of sets of data is performed based on a respective probability distribution characterizing a respective probability to obtain different numbers of sets of data of the respective group;

using the plurality of randomized reduced training sets of data in a classification algorithm implementing a plurality of decision trees for determining a relationship between the at least one label and the features of the electronic items, wherein each randomized reduced training set of data is used in a different decision tree of the plurality of decision trees of the classification algorithm for determining the relationship between the at least one label and the features of the electronic items based on respective outputs of the plurality of decision trees; and storing an output of the classification algorithm in the non-transitory computer-readable memory medium.

2. The method of claim 1, wherein, for a feature, feature values of different sets of data meet the similarity criterion when at least one of (a), (b), (c) and (d) is met:

(a) the feature values are equal;
(b) the feature values do not differ one from the other more than a threshold;
(c) the feature values are equal after the feature values have been approximated;
(d) at least one of (a), (b), (c) is met and label values of the different sets of data are similar according to a second similarity criterion.

3. The method of claim 1, wherein the features correspond to manufacturing data of the electronic item and the at least one label corresponds to at least one quality attribute of the electronic item.

4. The method of claim 1, wherein for a majority of the groups comprising a plurality of sets of data, a number of aggregated sets of data is less than a number of the sets of data of the group by a magnitude of at least ten.

5. The method of claim 1, wherein the aggregated representation of at least one label value of the one or more sets of data of the group comprises a sum of all label values of the one or more sets of data of the group.

6. The method of claim 1, wherein the randomizing further comprises randomizing, for each aggregated set of data of the reduced training set of data, the aggregated representation of at least one label value associated with the aggregated set of data.

7. The method of claim 6, wherein:

randomizing the aggregated representation of at least one label value associated with the aggregated set of data is based on a probability distribution characterizing probability to obtain different values for the aggregated representation of the at least one label value.

8. The method of claim 1, wherein the reduced training set of data comprises a plurality of aggregated sets of data, wherein the number of aggregated sets of data in the reduced training set of data does not increase if the training set of data is expanded with at least one set of data comprising feature values which are similar to feature values already present in the training set of data for at least one set of data, according to the similarity criterion.

9. The method of claim 1, comprising, by a processing unit providing at least one set of data comprising a plurality of feature values representative of at least one electronic item, for which at least one label value is to be predicted, and predicting, based on the relationship, the label value associated with the set of data, thereby allowing prediction for the at least one electronic item.

10. The method of claim 1, further comprising, by the processing unit:

based on the relationship, determining at least one of:

an importance of one or more features with respect to the at least one label, the importance being representative of a level of contribution of the features in the at least one label; and an impact of one or more features with respect to the at least one label, the impact being representative of whether the one or more features increase or decrease the at least one label.

11. The method of claim 1, wherein:

the training set data is collected from at least operational data collected from at least a manufacturing line of one or more electronic items, wherein the method further comprises updating the relationship between the at least one label and the features of the electronic items based on an update of the operational data during manufacturing.

12. A system, comprising:

anon-transitory computer-readable memory medium; and a processor coupled to the memory medium, wherein the processor is configured to:

obtain a training set of data comprising a plurality of sets of data each representative of an electronic item, each set comprising feature values for a plurality of features, and for at least one label;

build a reduced training set of data which comprises an aggregated representation of the training set of data, the building comprising:

dividing the sets of data into a plurality of groups, wherein each set of data is assigned to one group, wherein all sets of data for which feature values meet at least one similarity criterion are in the same group, wherein the at least one similarity criterion comprises feature values for at least one feature not differing by more than a threshold amount between sets of data of the group; and storing in the reduced training set of data, for each group, an aggregated set of data comprising:

an aggregated representation of feature values for the sets of data of the group, wherein the aggregated representation of feature values comprises an average of the feature values for the sets of data of the group, an aggregated representation of at least one label value of the sets of data of the group, wherein the aggregated representation of the at least one label value comprises a sum of label values for the sets of data of the group, and a number of sets of data of the respective group, wherein the number of sets of data is less than the total number of sets of data of the respective group; and randomize the number of sets of data of each of the plurality of groups of the reduced training set of data a plurality of times in order to obtain a plurality of randomized reduced training sets of data, wherein randomizing the number of sets of data is performed based on a respective probability distribution characterizing a respective probability to obtain different numbers of sets of data of the respective group;

use the plurality of randomized reduced training sets of data in a classification algorithm implementing a plurality of decision trees for determining a relationship between the at least one label and the features of the electronic items, wherein each randomized reduced training set of data is used in a different decision tree of the plurality of decision trees of the classification algorithm for determining the relationship between the at least one label and the features of the electronic items based on respective outputs of the plurality of decision trees; and store an output of the classification algorithm in the non-transitory computer-readable memory medium.

13. The system of claim 12, wherein, for a feature, feature values of different sets of data meet the similarity criterion when at least one of (a), (b), (c) and (d) is met:
(a) the feature values are equal;
(b) the feature values do not differ one from the other more than a threshold;
(c) the feature values are equal after the feature values have been approximated;
(d) at least one of (a), (b), (c) is met and label values of the different sets of data are similar according to a second similarity criterion.

14. The system of claim 12, wherein the features correspond to manufacturing data of the electronic item and the at least one label corresponds to at least one quality attribute of the electronic item.

15. The system of claim 12, wherein the randomizing comprises randomizing, for each aggregated set of data of the reduced training set of data, the aggregated representation of at least one label value associated with the aggregated set of data.

16. The system of claim 12, wherein the processor is further configured to: provide at least one set of data comprising a
plurality of feature values
representative of at least one electronic item, for which at least one label value is to be predicted, and
predict, based on the relationship, the label value associated with the set of data, thereby allowing prediction for the at least one electronic item.

17. A non-transitory storage device readable by a machine, tangibly embodying a program of instructions executable by the machine to perform operations comprising:
obtaining a training set of data comprising a plurality of sets of data each representative of an electronic item, each set comprising feature values for a plurality of features, and for at least one label;
building a reduced training set of data which comprises an aggregated representation of the training set of data, the building comprising:
dividing the sets of data into a plurality of groups, wherein each set of data is assigned to one group, wherein all sets of data, for which feature values meet at least one similarity criterion, are in the same group, wherein the at least one similarity criterion comprises feature values for at least one feature not differing by more than a threshold amount between sets of data of the group,
storing in the reduced training set of data, for each group, an aggregated set of data comprising:
an aggregated representation of feature values for the sets of data of the group, wherein the aggregated representation of feature values comprises an average of the feature values for the sets of data of the group,
an aggregated representation of at least one label value of the sets of data of the group, wherein the aggregated representation of the at least one label value comprises a sum of label values for the sets of data of the group, and
a number of sets of data of the respective group, wherein the number of sets of data is less than the total number of sets of data of the respective group; and
randomizing the number of sets of data of each of the plurality of groups of the reduced training set of data a plurality of times in order to obtain a plurality of randomized reduced training sets of data, wherein randomizing the number of sets of data is performed based on a respective probability distribution characterizing a respective probability to obtain different numbers of sets of data of the respective group;
using the plurality of randomized reduced training sets of data in a classification algorithm implementing a plurality of decision trees for determining a relationship between the at least one label and the features of the electronic items, wherein each randomized reduced training set of data is used in a different decision tree of the plurality of decision trees of the classification algorithm for determining the relationship between the at least one label and the features of the electronic items based on respective outputs of the plurality of decision trees; and
storing an output of the classification algorithm in the non-transitory computer-readable memory medium.

18. The non-transitory storage device of claim 17, wherein, for a feature, feature values of different sets of data meet the similarity criterion when at least one of (a), (b), (c) and (d) is met:
(a) the feature values are equal;
(b) the feature values do not differ one from the other more than a threshold;
(c) the feature values are equal after the feature values have been approximated;

(d) at least one of (a), (b), (c) is met and label values of the different sets of data are similar according to a second similarity criterion.

19. The non-transitory storage device of claim 17, wherein the randomizing comprises randomizing, for each aggregated set of data of the reduced training set of data, the aggregated representation of at least one label value associated with the aggregated set of data.

20. The non-transitory storage device of claim 17, wherein the operations further comprise:
   providing at least one set of data comprising a plurality of feature values representative of at least one electronic item, for which at least one label value is to be predicted, and
   predicting, based on the relationship, the label value associated with the set of data, thereby allowing prediction for the at least one electronic item.

* * * * *

UNITED STATES PATENT AND TRADEMARK OFFICE
CERTIFICATE OF CORRECTION

PATENT NO. : 11,775,876 B2
APPLICATION NO. : 16/545708
DATED : October 3, 2023
INVENTOR(S) : Katsuhiro Shimazu It is certified that error appears in the above-identified patent and that said Letters Patent is hereby corrected as shown below:

In the Claims

Claim 12, Column 24, Line 47, please add a space after "a" and before "non-transitory".

Signed and Sealed this
Fourteenth Day of November, 2023

Katherine Kelly Vidal
*Director of the United States Patent and Trademark Office*